US011301030B2

(12) United States Patent
Cherupalli et al.

(10) Patent No.: US 11,301,030 B2
(45) Date of Patent: Apr. 12, 2022

(54) POWER SAVINGS IN PROCESSORS

(71) Applicants: Regents of the University of Minnesota, Minneapolis, MN (US); The Board of Trustees of the University of Illinois, Urbana, IL (US)

(72) Inventors: Hari Cherupalli, Minneapolis, MN (US); Rakesh Kumar, Urbana, IL (US); John Sartori, Minneapolis, MN (US)

(73) Assignees: Regents of the University of Minnesota, Minneapolis, MN (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 17/080,997

(22) Filed: Oct. 27, 2020

(65) Prior Publication Data

US 2021/0041938 A1 Feb. 11, 2021

Related U.S. Application Data

(62) Division of application No. 16/006,499, filed on Jun. 12, 2018, now Pat. No. 10,866,630.

(60) Provisional application No. 62/518,244, filed on Jun. 12, 2017.

(51) Int. Cl.
*G06F 1/3296* (2019.01)
*G06F 1/324* (2019.01)

(52) U.S. Cl.
CPC .......... *G06F 1/3296* (2013.01); *G06F 1/324* (2013.01)

(58) Field of Classification Search
USPC ........................................ 716/108
See application file for complete search history.

(56) References Cited

U.S. PATENT DOCUMENTS

| | | | | |
|---|---|---|---|---|
| 2003/0188268 A1* | 10/2003 | Konstadinidis | ....... | G06F 30/327 716/113 |
| 2009/0210841 A1* | 8/2009 | Prakash | ............. | G06F 30/3312 716/113 |
| 2011/0276321 A1* | 11/2011 | Tuan | ...................... | G06F 30/34 703/14 |

* cited by examiner

*Primary Examiner* — Mohammed Alam
(74) *Attorney, Agent, or Firm* — Dicke, Billig & Czaja, PLLC

(57) ABSTRACT

A method includes generating gate-level activity information of a processor design for all possible executions of a target application for any possible inputs to the target application. The method includes performing a constrained timing analysis on the processor design based on the gate-level activity information to determine a minimum operating voltage for executing the target application on the processor.

20 Claims, 7 Drawing Sheets

POWER SAVINGS IN PROCESSORS

CROSS REFERENCE TO RELATED APPLICATIONS

This application is a Divisional of U.S. application Ser. No. 16/006,499, titled "POWER SAVINGS IN PROCESSORS" filed Jun. 12, 2018, (Allowed), which claims priority to U.S. Provisional Patent Application No. 62/518,244, titled "EXPLOITING DYNAMIC TIMING SLACK FOR POWER SAVINGS" filed Jun. 12, 2017, and are incorporated herein by reference.

BACKGROUND

A large number of computing applications have recently exploded onto the scene. Notable among them include the internet of things, wearables, and sensor networks. A common thread running across these applications is that they often have ultra-low-power requirements. These requirements are due to the fact that these applications are either energy-constrained (e.g., when they are battery powered) or power-constrained (e.g., applications with inductive coupling or power scavenging).

Considering that these applications tend to be embedded, one option to target these applications is to use an application-specific integrated circuit (ASIC). However, many of these applications are cost-sensitive. Also, many of these applications need to be tuned or updated in the field. As a result, an ultra-low-power (ULP) embedded microprocessor or microcontroller is often a better fit.

In addition, ULP processors have rapidly become the most abundant type of processor in production today. New and emerging power- and energy-constrained applications such as the internet-of-things (IoT), wearables, implantables, and sensor networks have already caused production of ULP processors to exceed that of personal computers and mobile processors. It is projected that these applications will continue to rely on simple single-core ultralow-power processors in the future, will be powered by batteries and energy harvesting, and will have even tighter peak power and energy constraints than the power- and energy-constrained ULP systems of today. Unsurprisingly, low-power microcontrollers and microprocessors are projected to continue being the most widely-used type of processor in the future.

Further, the ultra-low power and energy requirements of emerging applications, along with the increasing leakage energy dissipation that has accompanied complementary metal-oxide-semiconductor (CMOS) scaling, have fueled interest in aggressive power gating techniques. Conventional aggressive power gating techniques perform module-based power gating, i.e., power gating of register-transfer level (RTL) modules during periods of inactivity. An RTL module is encapsulated with a well-defined port list, making it relatively easy to determine when a module is inactive based on input signals in the port list.

While RTL modules form convenient boundaries for defining power domains, module-based domains may not be the best option for supporting aggressive power gating. Logic is grouped into a module based on common functionality, not necessarily based on correlated activity. In several cases, activity of logic in the same module can have uncorrelated activity (e.g., different registers in the register file may not be used by the same instruction or even the same application), while logic in different modules can often be correlated (e.g., when one module feeds data or control signals to another).

DETAILED DESCRIPTION

Figure 1:
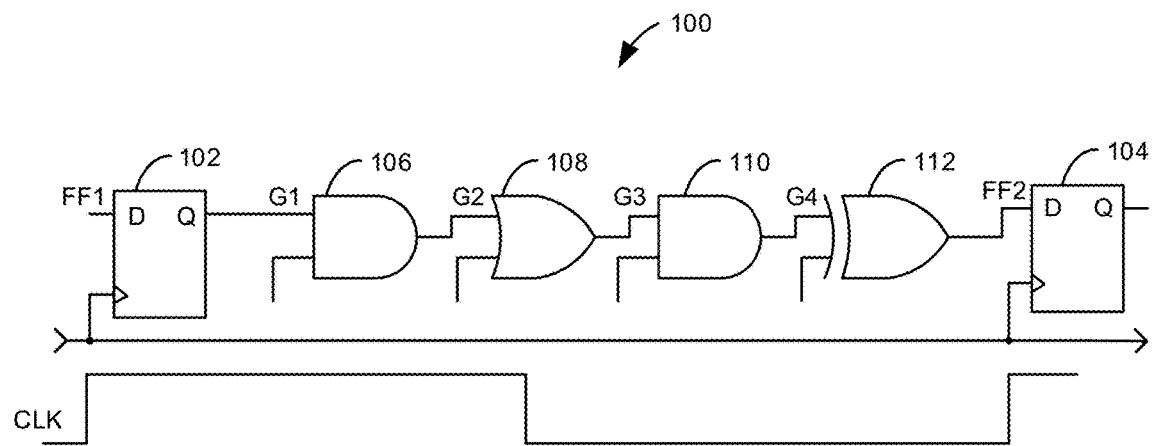
FIG. 1 illustrates one example of a path in a synchronous circuit.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Exploiting Dynamic Timing Slack for Energy Efficiency in Ultra-Low-Power Embedded Systems Disclosed herein, is a system and method to reduce power consumption in ultra-low-power embedded systems without reducing performance. The system and method leverages the observation that an embedded software application running on an ultra-low-power processor may not utilize all the functionalities provided by the processor. Only the parts of a processor that can be utilized by an application need to meet timing constraints. As used herein, the term "processor" may include any logic circuit that can execute an application. Therefore, in scenarios where unused functionalities correspond to timing-critical logic, there may exist timing slack between the most timing-critical functionalities in the processor and the most timing-critical functionalities that are exercised by the embedded software application running on the processor. This workload-dependent timing slack is called dynamic timing slack (DTS). DTS may exist for ultralow-power processors.

Since only exercised parts of the processor need to meet timing constraints for the processor to work correctly, DTS can be exploited to improve the energy efficiency of the processor by operating the processor at a lower voltage for the same frequency. A safe, energy-efficient operating voltage ensures that all utilized functionalities of a processor meet timing constraints, while functionalities that cannot be toggled by an embedded software application are allowed to violate timing constraints. Nevertheless, unlike timing speculative approaches that save power by reducing safety guardbands, exploiting DTS does not involve reducing guardbands for the subset of processor logic that is exercised by an application and therefore is completely non-speculative.

Exploiting DTS to improve energy efficiency of an ultra-low-power embedded system utilizes a process for identifying when DTS exists in a processor and how much DTS can be exploited while still guaranteeing safe operation of the processor. An automated technique is disclosed for identifying and exploiting DTS that is non-speculative and may require no programmer intervention and little or no hardware support, making it particularly relevant for the ultralow-power embedded systems. The proposed process can be used to optimize the minimum voltage for the software running on an embedded ultra-low-power processor. It can also be used to improve performance of the end application. The DTS identification process may be packaged as an automated tool that takes an application binary and processor RTL as input and determines the minimum safe operating voltage for the application on the processor.

The energy efficiency of ultra-low-power embedded systems may be improved based on identification and exploitation of dynamic timing slack. An automated process may be used for determining the amount of dynamic timing slack that can be exploited for a particular ultralow-power processor running an embedded software application and the corresponding minimum operating voltage that ensures safe execution of the application on the processor, without any programmer intervention. An application-specific $V_{min}$ (or $f_{max}$) that is guaranteed to be safe irrespective of the input or operating conditions may be determined. A microarchitectural support may be used to increase the benefits possible from exploiting dynamic timing slack. Potential power savings of up to 32% may be achieved for a common ultra-low-power processor over a range of embedded applications, at no performance cost.

Most modern processors are synchronous or clocked. This means that computation is performed in clock periods where data is passed from flip-flop (FF) to flip-flop (launch FF or startpoint to capture FF or endpoint) through some combinational logic gates. Transmission from launch to capture FF begins with a clock signal to the launch FF and must complete before the next clock signal reaches the capture FF (i.e., one clock period). For example, in the circuit 100 of FIG. 1 a logic transition (toggle) initiated by the data at the Q-pin of FF1 (launch FF) 102 must reach the D-pin of FF2 (capture FF) 104 in one clock period. A path that respects these constraints is said to meet timing. If the combined delay of gates G1 106, G2 108, G3 110, and G4 112 is greater than the clock period, the path does not meet timing. Decreasing the operating voltage reduces power consumption, but also increases logic delays, which can potentially cause a path to violate timing constraints. Note, however, that if the output of a path (e.g., the D-pin of FF2 104) does not toggle, the circuit will still operate correctly even if the path violates timing constraints, since the capture FF will still capture the correct (constant) value in each clock period.

A typical processor has a large number of paths, and all paths must meet timing. However, some paths may just meet timing with little time to spare (timing-critical paths), while for other paths the correct data is available at the D-pin of the capture FF (endpoint) significantly before the end of a clock period. Many emerging applications for ultra-low-power processors do not utilize a GPP's entire feature set. Non-exercised features can mean that only a subset of the paths in a processor are exercised (toggled). If the longest exercised path in the processor is not a timing-critical path (i.e., it produces data at its endpoint with time to spare), then this extra time may be traded for reduced power at no performance cost by keeping frequency constant and reducing the voltage of the processor to the lowest voltage where all exercised paths still meet timing. Any un-exercised paths are allowed to violate timing constraints. Note, as mentioned above, that if a path is not exercised, its output will remain constant, and the capture FF for the path will continue to capture the correct value in each clock period.

Figure 2:
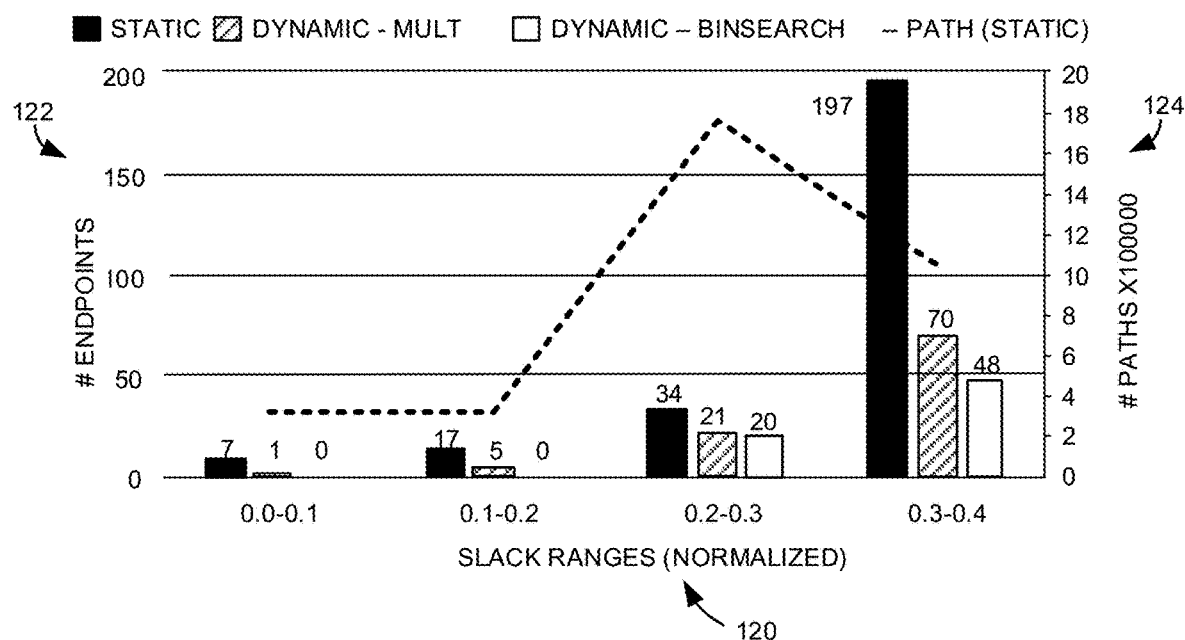
FIG. 2 illustrates one example static slack distribution versus dynamic slack distributions for two applications.

FIG. 2 illustrates one example static slack distribution versus dynamic slack distributions for two applications (mult and binSearch) on openMSP430. Slack is normalized to the processor clock period. The dynamic slack distributions show that both applications do not exercise all of the endpoints in the processor. FIG. 2 illustrates the existence of DTS in an example ultra-low-power processor. FIG. 2 compares several different slack distributions for slack up to 40% of the clock period, for a fully synthesized, placed, and routed openMSP430 processor. In the figure, the x-axis 120 has bins for various slack ranges (normalized to the clock period), the left y-axis 122 shows the number of processor endpoints with worst slack in a particular range, and the right y-axis 124 shows the number of paths with slack in a particular range.

Worst slack is defined for an endpoint (FF) as the timing slack of the longest path terminating at that endpoint. Since many paths lead to the same endpoint, the number of paths in a design is typically several orders of magnitude larger than the number of endpoints. In the processor, each endpoint corresponds to tens or hundreds of thousands of paths. The static slack distributions, Static and Path (Static), characterize the worst slacks of all endpoints and paths in the processor, respectively, whether exercised or not. Note that a large number of paths in the design are statically critical (over 325000). This is consistent with previous observations on other designs. Nevertheless, when a particular application is executed on the processor, not all the paths or path endpoints may be exercised. The other two series in FIG. 2 show the distributions of worst slacks for only the endpoints in the processor that are exercised by the mull and binSearch applications. These are called dynamic slack distributions, and the longest exercised paths in a design are called the dynamic critical paths for a particular application. Slack distributions are reported at the worst-case corner to isolate DTS from all other phenomena that might affect the minimum operating voltage for an application (e.g., voltage, temperature, or aging variations).

The following observations and inferences can be drawn from FIG. 2. Several endpoints of the processor (and hence orders of magnitude more paths) are not exercised when a particular application is executed. This is demonstrated by the difference between the static slack distribution and the two dynamic slack distributions. For example, the processor contains seven endpoints (and hundreds of thousands of paths) with worst slack in the range [0.0-0.1] and 17 endpoints in the range of [0.1-0.2], but binSearch does not exercise any of those endpoints (or their associated paths). Different applications exercise different processor features and can have different dynamic critical paths. Consequently, the amount of available DTS can be different for different applications.

For example, since binSearch does not exercise any endpoints with worst slack less than 0.2, its normalized DTS is at least 0.2. On the other hand, mull exercises one endpoint with worst slack in the range [0.0-0.1] (the timing-critical multiplier overflow register), and it has less DTS than binSearch. DTS represents an opportunity to save power without sacrificing performance. For example, if binSearch is executing on the processor, operating voltage can be reduced while keeping frequency constant, such that paths with timing slacks of up to 20% of the clock period of the processor violate timing constraints (since these paths are not exercised by the application). This generates power savings without affecting either the functionality or performance of the processor for binSearch. Note also that unlike timing speculative approaches that save power by reducing safety guardbands, exploiting DTS does not require guardband reduction and therefore is completely non-speculative. Exploiting DTS simply involves adjusting the voltage of the processor to the minimum safe voltage for the subset of processor logic that is exercised by an application. Guardbands for the exercised logic are not violated.

Given that DTS exists for some applications, "free" power savings can be attained at no performance cost and no risk to timing safety by adjusting the operating voltage of the processor to exploit DTS while leaving design guardbands in place.

Ultra-low-power embedded systems are a promising context for exploiting DTS, since embedded applications typically do not use all of the hardware features provided by a processor. Such applications may, therefore, not exercise the most timing critical logic in a processor. Also, ultra-low-power processors are optimized to minimize area and power rather than maximize performance (e.g., many common microcontrollers have a small number of pipeline stages), which typically results in relatively less balanced logic across pipeline stages or more delay variation across processor logic within a pipeline stage. This may increase available DTS, since in a design with larger delay variation, finite options for cell drive strength, threshold voltage, layout, etc. mean that not all paths will become timing-critical after design optimization. It has been found that only a fraction of logic in an embedded design may be timing-critical.

Below, an automated method is disclosed that identifies how much DTS is guaranteed to exist for a given processor and application under worst case conditions and determines the minimum operating voltage at which the application is guaranteed to execute safely at a given frequency.

Figure 3:
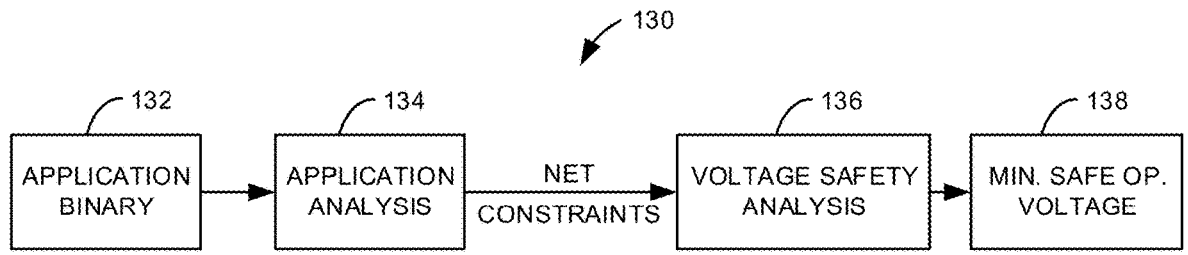
FIG. 3 is a flow diagram illustrating one example of a method to identify dynamic timing slack (DTS).

To exploit DTS, a method is used that determines the minimum operating voltage at which an application is guaranteed to work correctly irrespective of the input and operating conditions. This automatically precludes all profiling or measurement-based approaches, since such approaches cannot guarantee that the minimum operating voltage determined during profiling is safe under all conditions; the voltage may not be safe when either the operating conditions change (e.g., temperature increases, the chip experiences aging-based degradation, the application is run on a different chip with a different amount of process variations, etc.) or the application is executed with a different input set. Instead, the approach for DTS identification and exploitation, illustrated in method 130 of FIG. 3, is based on analyzing an embedded software application to identify which parts of a design (e.g., registers, paths) cannot be exercised by the application for any input and subsequently determining the minimum operating voltage of the design such that parts of the design that can be exercised by the application are guaranteed to meet timing constraints even under worst case operating conditions. Parts of the design that cannot be exercised by the application are allowed to violate timing constraints. The method may be automated and may determine the minimum safe operating voltage for an embedded application on a processor without any programmer intervention. Thus, an application designer need only provide an application binary (indicated at 132); the tool automatically analyzes the binary and processor to determine the minimum voltage at which the processor can safely execute the application without reducing operating frequency at all.

Figure 4:
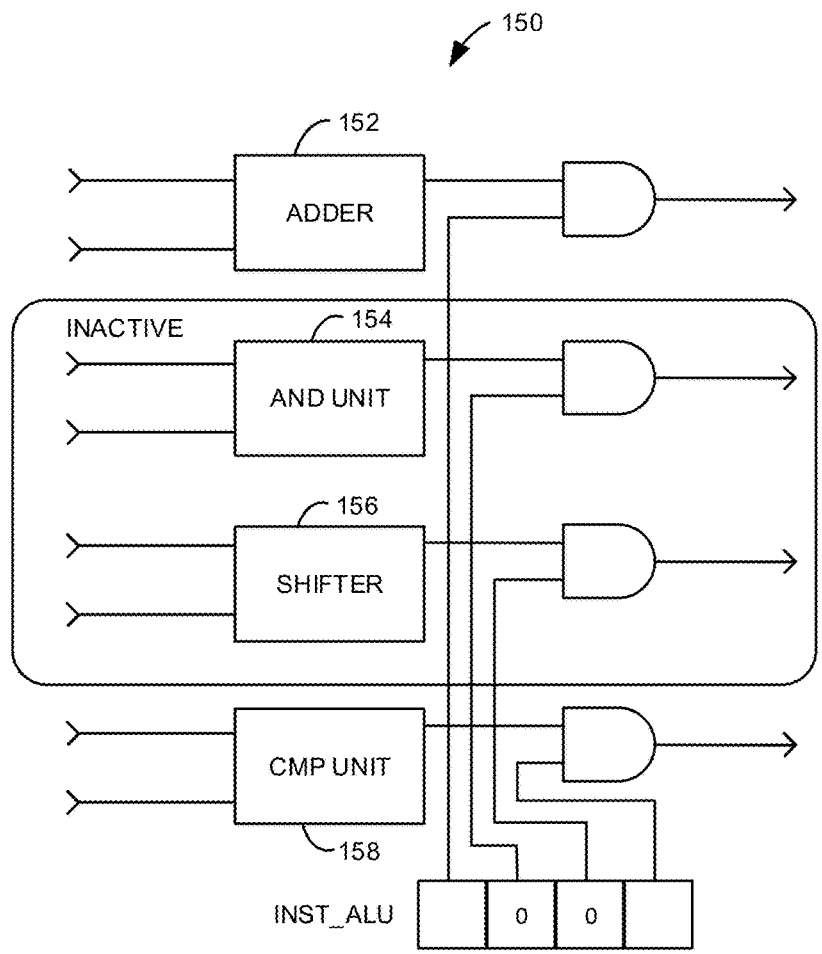
FIG. 4 illustrates one example of DTS identification enabled by application analysis.

As shown in FIG. 4, the first stage of the DTS identification method at 134 analyzes an application to determine the parts of a design that cannot be exercised by the application. This application analysis stage takes an application binary 132 as input and evaluates the application's control flow graph (CFG) symbolically on the processor to determine which logic the application could possibly exercise (toggle) and which logic the application can never toggle. Analysis is input-independent, and information specifying which parts of the processor cannot be toggled by the application are passed to the next analysis stage in the form of design constraints. The automated application analysis is described in detail below.

The second stage of the DTS identification method at 136 takes as input the constraints (i.e., nets in the design that can never be toggled by the application) identified during application analysis and performs a constrained timing analysis on the processor design to determine the minimum safe operating voltage (indicated at 138) for the constrained design. Constrained timing analysis is performed at worst-case conditions (i.e., the slow process corner assuming worst-case process, voltage, temperature, and aging variations) to ensure that the selected voltage is safe under all possible operating conditions without reducing any design guardbands. The minimum safe operating voltage is chosen such that all parts of the processor that can be exercised by the application are guaranteed to meet timing constraints. Even though some processor logic may not meet timing constraints at the minimum safe voltage determined by voltage safety analysis, the application is still guaranteed to execute correctly since application analysis guarantees that this logic will not be toggled by the application. Thus, if the automated DTS identification method identifies a more aggressive, safe operating voltage for an application, then operating at the new voltage results in free power savings, since the processor executes the application correctly without reducing frequency or performance at all. The voltage safety analysis is described in detail below.

The goal of application analysis for DTS identification is to identify logic in the processor that an application is guaranteed to never exercise for any possible execution of the application. DTS is exposed for an application when un-exercised logic contains or contributes to the delay of timing-critical logic in the processor. DTS depends on two factors—a processor's functionalities (i.e., the architecture) and how those functionalities are used (or not used) by the processor's embedded software application. Application analysis performs symbolic evaluation of an application's CFG on the processor and observes which logic (specifically, which nets) in the processor cannot be toggled by the application.

The automated method for determining which nets in a processor design can be toggled by an application is based on the intuition that the embedded software application executing on a processor determines the possible states and state transitions that the processor can and cannot express. For example, an application that contains no multiply instructions will never exercise the logic in the processor's hardware multiplier. To fully explore which logic an application can exercise in a processor, the application analysis tool creates a CFG from the application binary and explores the possible paths through the CFG in breadth-first fashion. Each CFG path corresponds to a sequence of instructions, and CFG exploration involves performing gate-level simulation of the instruction sequences on the processor while monitoring the values of nets in the design. If a net toggles for any of the possible CFG paths, the net can be exercised by the application and will not be constrained. If a net maintains a constant value during exploration of the possible CFG paths, the net cannot be exercised by the application, and the tool generates a constraint specifying the constant value of the net for the application.

Because the logic exercised by an application can depend on the application's input data, data-independent application analysis is performed by injecting "don't care" (X) values into the processor logic whenever it reads an input value. This is equivalent to making worst case assumptions on input data. Any net that is assigned a value of X during CFG exploration cannot be constrained. In this way, the net constraints reported by application analysis guarantee that the constrained nets can never be toggled by the application for any possible input set. The pseudocode below describes the automated approach for DTS identification through application analysis.

Application Analysis for DTS Identification Pseudocode

```
Procedure Identify Constraints(app_binary, netlist)
 1.  Add all nets to net_constraints[ ] // initially, constrain all nets
 2.  Create CFG from app_binary and identify CFG paths P_CFG
 3.  foreach path p ∈ P_CFG do
 4.      Perform symbolic execution for p, using X for input values
 5.      if net n toggles or is assigned with X during symbolic execution then
 6.          Remove n from net_constraints[ ] // cannot constrain nets that can toggle
 7.      end if
 8.  end for
 9.  foreach net n ∈ net_constraints[ ] do
10.      Record constrained value of n in net_constraints[n]
11.  end for
12.  return net_constraints[ ]
```

For an example of how application analysis can automatically identify un-exercised logic in a design that can be constrained to expose DTS, consider the inst_alu register in openMSP430. This 12-bit one-hot encoded register selects the function unit that will execute an instruction. A bit selecting a particular function unit will be set by an instruction that executes on the function unit. Not all applications utilize the entire instruction set, and a bit in inst_alu will not be toggled by an application that does not use the function unit selected by the bit. Thus, the select bit corresponding to this instruction's function unit remains a constant zero during application analysis. As an example of different DTS for different applications, rle does not use right shift or left shift instructions, but tea8 does. Thus, application analysis reports a constraint for the shifter select bit in inst_alu for rle but not for tea8.

FIG. 4 illustrates how application analysis can automatically identify constraints for un-exercised nets in inst_alu with a simplified example (i.e., a processor 150 with only 4 operation types—adder 152, and unit 154, shifter 156, and compare unit 158).

Example Code Block for tHold:

```
mov #0, r4 ; Initialize counter
loop:
move &0x0020, r15 ; Read from mem/port
cmp r15, #10000 ; Threshold Detection
jl else
then:
inc r4
mov r4, 0x0028 ; Write to mem/port
else:
jmp loop
```

As described above, a select bit in inst_alu only toggles during the execution of an embedded software application if the application contains an instruction that executes on the function unit selected by the bit. Exploring the CFG of the (tHold) application generates toggles in the adder and comparator select bits in inst_alu, since tHold contains an inc instruction (which executes on the adder) and a cmp instruction. The code does not contain any and or shift instructions, however, so the corresponding select bits remain constant zero during application analysis of tHold. Applying these constraints propagates a controlling value to the select gates for the corresponding function units and eliminates the logic (labeled inactive) from consideration during timing analysis, potentially exposing DTS.

Voltage safety analysis takes as input the constraints identified during application analysis described above, applies them to the gate-level netlist, and performs timing analysis on the constrained design to determine the minimum voltage at which the design is guaranteed to operate safely for a given application. Voltage safety analysis may be performed for worst case timing conditions such that the minimum operating voltage reported is guaranteed to be safe independent of PVT variations. Like application analysis, voltage safety analysis may be fully automated and may require no effort on the part of the programmer. The combination of application analysis and voltage safety analysis forms an end-to-end automated tool that takes an application binary as input and reports the minimum operating voltage at which the processor can safely execute the application.

Voltage safety analysis is based on the observation that if part of a processor design cannot be exercised by the embedded software application, then it can be constrained to a constant value or ignored during design timing analysis to expose DTS and reveal a more aggressive operating voltage.

During voltage safety analysis, net constraints reported by application analysis are applied to the gate-level netlist. Propagating these constants through the gate-level netlist can identify more constrained logic by propagating controlling values to logic gates. Any logic with a constant controlling value cannot toggle and thus can be ignored during timing analysis. A controlling value is defined for a gate as a value that, when assigned to an input pin of the gate, uniquely determines the output of the gate. For example, the controlling value of an AND/NAND gate is '0', because when any input to an AND/NAND gate is '0', the output is controlled to '0'/'1', regardless of the value of the other input. Similarly, the controlling value of an OR/NOR gate is '1'. An XOR gate does not have a controlling value.

Figure 5:
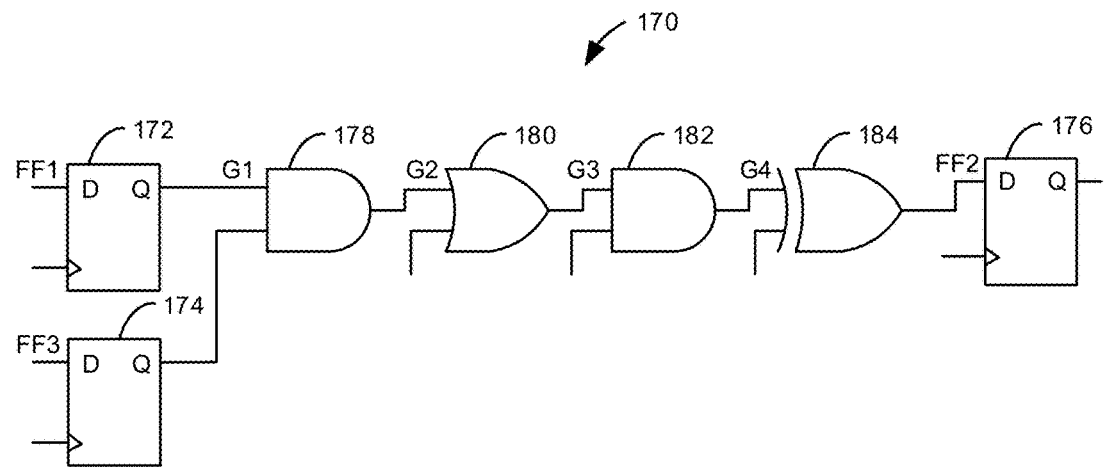
FIG. 5 illustrates one example of a circuit to illustrate the potential of design constraints to expose DTS.

FIG. 5 describes the significance of propagating constraints for voltage safety analysis via a circuit 170. If application analysis reveals that FF2 176 cannot toggle for a particular embedded software application (e.g., if FF2 176 is a register in the multiplier and the application contains no multiply instructions), then all paths terminating at FF2 176 cannot toggle for the application (since a toggle on any path terminating at FF2 176 implies a toggle of FF2). As another example, if application analysis reveals that FF3 174 cannot toggle for an application and is constrained to a value of '0', then the path FF1 172-G1 178-G2 180-G3 182-G4 184-FF2 176 also cannot toggle for the application, since an input to one of its gates (G1) is constrained to a controlling value. If the path in question is a critical path in the design, then constraining the path may expose DTS.

All paths that pass through an un-toggled net or gate can be ignored during voltage safety analysis for an application. Such paths, by definition, are not toggled by the application, and the application will complete successfully even if these paths do not meet timing constraints. Voltage safety analysis ensures that all other paths in the design (the exercisable paths) meet timing constraints.

Once all possible constraints identified by application analysis have been applied to a design, voltage safety analysis checks whether all of the exercisable paths remaining in the design (e.g., the dynamic critical paths) meet timing constraints. The minimum safe operating voltage for the constrained design may be determined by lowering the voltage in steps and performing constrained timing analysis at each step to find the lowest voltage at which all paths in the constrained design meet timing constraints. The pseudocode below describes the voltage safety analysis stage of the automated DTS identification method. Applying constraints to the netlist simply involves assigning constant values (the constraints identified above) to nets in the design. The function GetDynamicCriticalPath uses STA to find the longest delay path in the constrained design and therefore has linear time complexity with the number of gates and nets in the circuit. On this system, voltage safety analysis takes a maximum of 10 minutes and 10 seconds for OpenMSP430 (7218 gate design) to report the dynamic critical path at the 61 voltage levels spaced at 10 mV intervals between 1.00 V and 0.40 V.

Voltage Safety Analysis for DTS Identification Pseudocode

```
Procedure Find V_min(net_constraints[ ],netlist)
   1.   Read netlist and initialize PrimeTime Tcl socket interface
   2.   V_min, V ← V_nominal
   3.   foreach constraint c ∈ net_constraints[ ] do
   4.       Apply c to netlist // using set_case_analysis
   5.   end for
   6.   P_V ← GetDynamicCriticalPath( )
   7.   S_V ← GetSlack(P_V)
   8.   while S_V ≥ 0 do
   9.       V ← V −0.01
  10.       P_V ← GetDynamicCriticalPath( ) // report longest delay path at voltage V
  11.       S_V ← GetSlack(P_V) // report DTS at voltage V
  12.       if S_V ≥ 0 then
  13.           V_min ← V // if design meets timing constraints, this voltage is safe
  14.       end if
  15.   end while
  16.   return V_min
```

If it is not possible to statically determine whether a net can toggle based on application analysis, then the net cannot be constrained during voltage safety analysis to expose DTS. However, it may be desirable to constrain some nets of this type to expose more DTS. For such scenarios, a microarchitectural support may be used in the form of a circuit that detects a signal transition and sends a control signal to the voltage regulator to adapt the operating voltage to a safe level for the impending transition. When the monitored signal transitions back to its original value, the circuit stops asserting the control signal and the voltage regulator returns to the original aggressive voltage for the embedded software application.

Figure 6:
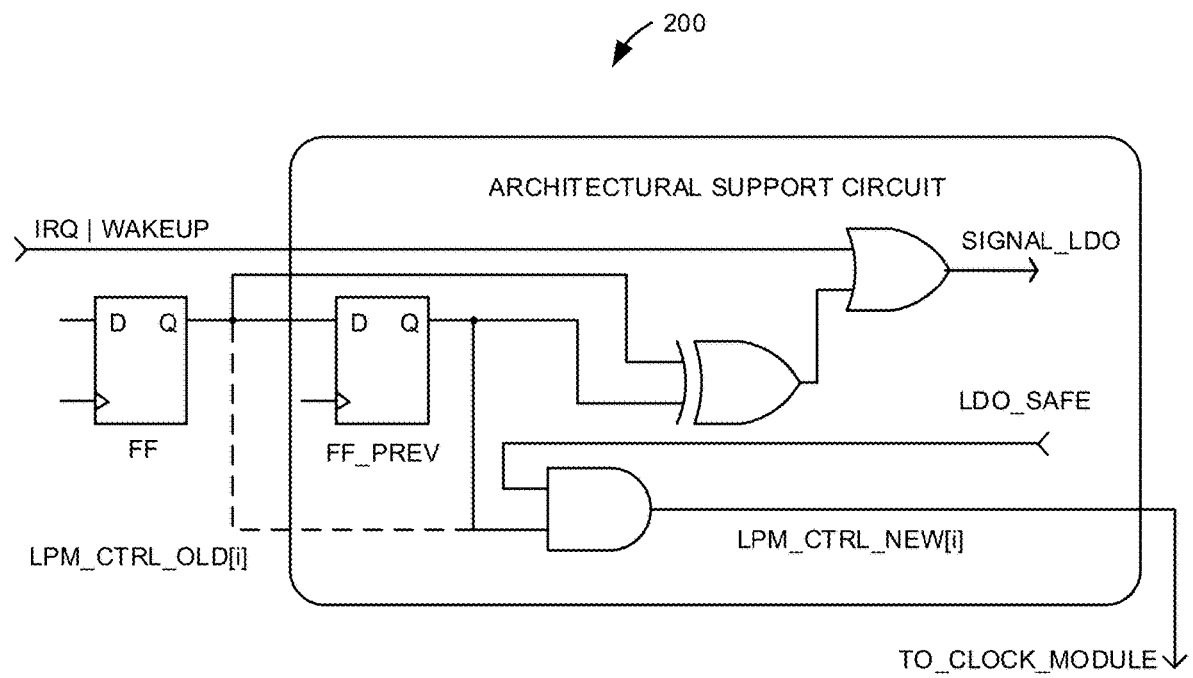
FIG. 6 illustrates one example of a microarchitectural support for toggle detection and voltage adaptation.

FIG. 6 illustrates an example of a microarchitectural support 200 for interrupt/low-power mode wake-up detection and adaptation in openMSP430. The circuit adds an extra FF to create a 2-bit shift register with the monitored low-power mode register bit (LPM ctrl). Different values between the FFs indicate a transition. An IRQ or wakeup signal or a transition of a low-power mode register bit sends a control signal (signal LDO) that tells the voltage regulator to transition to a safe voltage (nominal) for the impending mode transition. Support circuitry delays the mode transition until an ack signal (rising edge of LDO safe) from the voltage regulator indicates that the voltage has stabilized at the safe level for execution of the mode transition sequence. Once wake-up is complete, the voltage of the processor can be returned to the minimum safe operating voltage for the embedded software application. This happens when signal LDO goes low after any IRQ or wakeup signal is reset (automatically by the processor) and the operating mode transition is complete (i.e., FF=FF prev).

In most scenarios, there are no constraints on how quickly the supply voltage must be adjusted after detecting a toggle. The slew rate simply determines the performance overhead of stalling program execution on a toggle detection until the supply voltage adjustment is complete. In case of some hard realtime systems, a slow voltage adjustment may cause missed hard deadlines, leading to correctness problems. The minimum slew rate for such systems will be determined by the realtime deadline and the latency jitter that the system was designed for. For many realtime systems, especially ones that interface with buses (e.g., CAN, FlexRay, or RealTimeEthernet), allowable jitter is in the ms to µs range. For such systems, even a slow off-chip voltage regulator will suffice, since the voltage adjustment required to exploit DTS would take around 10 µs at most with a slow regulator.

DTS can also be exploited to increase frequency without increasing the voltage. It is also possible to exploit DTS to maximize performance for the same power budget by reducing voltage and increasing frequency in tandem.

Note that the voltage safety analysis may be performed at the worst case (slow) corner, so the operating voltage determined by the analysis is guaranteed to be safe even when the design is affected by worst case variations. This comes at the expense of power benefits. The average power cost of performing analysis at worst case rather than typical case may be about 23%. The DTS identification method performs analysis at the worst-case design corner, leaving unexploited benefits at better-than-worst-case (BTWC) operating conditions. Below, is described how the DTS identification method may be combined with BTWC design techniques to reclaim benefits of guardband reduction while safely exploiting DTS. The method for exploiting DTS is also compared against two popular BTWC design techniques—critical path monitors (CPMs) and Razor. CPMs: CPMs exploit static timing slack by monitoring circuits that track the static critical paths of a processor and adjusting the voltage to ensure that the circuit and processor meet timing constraints when the processor operates at an aggressive BTWC operating point. CPMs are less intrusive and have lower design and verification overhead than many comparable BTWC techniques and may also be more conservative, since they cannot track local process, voltage, and temperature (PVT) variations. For the evaluations of designs that employ CPMs, the operating point to maintain guardbands for local PVT variations were selected. Compared to the power of the processor, the power overhead of CPM circuits is negligible.

The timing slack in guardbands under BTWC conditions (exploited by CPMs) is orthogonal to DTS (timing slack between un-exercised static critical paths and exercised dynamic critical paths). As such, DTS exploitation techniques may be used synergistically with CPMs for additional power reduction by using CPMs to track dynamic critical path delay rather than static critical path delay. CPMs that track dynamic critical path delay as dynamic critical path monitors (DCPMs) are referred to as opposed to conventional static critical path monitors (SCPMs). Since the DTS identification techniques identify the dynamic critical paths exercised by an application, tuning CPMs to track dynamic critical path delay is feasible using tunable CPMs.

Razor: Razor introduces error detection and correction circuitry to a processor and adjusts the processor's voltage to operate at the minimum energy operating point, close to the point of first failure. Since Razor determines an aggressive operating voltage by observing when errors exceed a predefined threshold, it can eliminate guardbands and also exploit DTS. While Razor can potentially exploit DTS, it adds non-trivial area, design, and verification overheads, making it unsuitable for ultra-low-power processors. The approach disclosed herein, on the other hand, is non-speculative—software analysis determines an application-specific $V_{min}$ (or $f_{max}$) that is guaranteed to be safe, irrespective of the input or operating conditions, since input-independent analysis is performed at the worst-case (slow) corner. As a result, the technique has little or no hardware overhead and provides benefits even during worst-case operating conditions. Also, the approach for exploiting DTS can even be used for existing processors and applications, without need for re-designing and re-certifying the processor.

To evaluate Razor, first flip-flops (FFs) are identified that need to be replaced with Razor FFs by selecting the minimum safe operating voltage for the processor under typical case operating conditions and all the FFs are identified that can violate timing constraints at this voltage under worst case operating conditions. After replacing these FFs with Razor FFs containing an extra (shadow) latch, clock buffer, XOR gate for error detection, and MUX for error correction, an "OR" network was added to combine the error signals to be sent to the voltage regulator, and hold time constraints were placed on the Razor FFs during layout of the synthesized netlist to generate the placed and routed netlist. Implementing Razor in this fashion resulted in an area overhead of 14% for openMSP430. Note, however, that this is an optimistic evaluation of Razor, as the Razor overheads for metastability detectors, error correction (dynamic performance and power overheads), clock gating, error rate measurement, and voltage control logic were not considered. Also, the design was not able to meet the hold time constraint for all Razor FFs (one of several difficult challenges for Razor designs). Although any error correction overheads were not accounted for, the Razor-based design was evaluated at a reduced voltage corresponding to a 1% error rate for each benchmark.

SCPMs achieve significant power reduction at BTWC operating points (typical, best) but no reduction under worst case conditions. DTS, however, can be exploited for significant power savings (25%) even in worst case conditions. Exploiting DTS synergistically with CPMs (DCPMs+DTS) achieves significant additional benefits over SCPMs at BTWC operating points.

As mentioned above, Razor may exploit DTS in addition to static timing slack resulting from BTWC operating conditions. Under best-case conditions, Razor can reduce power more than DTS+DCPMs, since CPMs maintain guardbands to protect against local variations. Under worst-case conditions, exploiting DTS (with or without DCPMs) reduces power more than Razor, even though Razor exploits DTS. This is due to the power overheads associated with Razor-based design. Nevertheless, both best-case and worst-case conditions are rare. Under typical conditions, Razor and DCPMs+DTS achieve similar power savings. However, the automated techniques for exploiting DTS may be more attractive, especially in ultra-low-power embedded designs, due to the area, design, and verification overheads of Razor.

The disclosed method for identifying and exploiting DTS is very effective at improving the energy efficiency of ultra-low-power embedded systems. For complex processors, DTS requires that the subset of exercised logic for a given application is not timing-critical. Unlike ultra-low-power processors, which are optimized to minimize power and area, processors that are optimized for high performance may exhibit more balanced logic delays (slack wall) and consequently less DTS. At the same time, only 7-15% of flip-flops in the Alpha processors are near-critical. Ultra-Sparc T2 is reported to have similar behavior. It may be possible to exploit DTS for such designs.

More complex processors also contain performance-enhancing features such as large caches, prediction or speculation mechanisms, and out-of-order execution, that introduce non-determinism into the instruction stream. The application analysis is capable of handling this added non-determinism at the expense of analysis tool runtime. For example, by injecting an X as the result of a tag check, both the cache hit and miss paths will be explored in the memory hierarchy. Similarly, since the application analysis tool already explores taken and not-taken paths for input-dependent branches, it can be easily adapted to handle branch prediction. The approach for input-independent CFG exploration is easily modifiable to perform input-independent exploration of the data flow graph (DFG), and thus can be made to analyze out-of-order execution. Finally, even in the worst case where DTS cannot be exploited for a complex processor, note that DTS benefits are high for ultra-low-power embedded processors. These processors are already ubiquitous and are also expected to power a large number of emerging applications.

The automated application analysis method employs techniques similar to symbolic execution, where X symbols are propagated for input values. One limitation of the general symbolic execution approach is a potential explosion of possible CFG paths as CFG complexity increases. This issue is ameliorated in the context of in-order processors (e.g., the ultra-low-power processors) because the maximum length of instruction sequences (CFG paths) that must be considered is limited based on the number of instructions that can be resident in the processor pipeline at once. However, for complex applications running on complex processors, heuristic techniques may be used to improve the scalability of symbolic execution.

Also, complex applications may have more phases with distinct behavior and more complex CFGs. For such applications, per-phase application analysis may expose more DTS. Once phases have been identified, the application analysis tool can easily identify a unique minimum safe voltage corresponding to each phase. Phase adaptation can be achieved by instrumenting the binary to change the voltage prior to execution of each phase.

The use of an OS is common in several embedded application domains as well as in more complex systems. Thus, system code may be analyzed in addition to application code to identify available DTS.

Application analysis of system code reveals that many nets may not be exercised by an OS. For example, for an OS running with applications that do not use the multiplier, average power savings from exploiting DTS are 21.1%. For applications that use the multiplier, power savings are 11.2% with the OS.

In several settings, it may not be possible to analyze the system code completely. To guarantee safety when exploiting DTS in such settings, any un-analyzed code must be run at nominal voltage. For example, this is a simple alternative to application analysis for handling startup code, bootloader, etc. that runs only briefly. Voltage can be reduced to exploit DTS after startup when the system enters user mode.

Multi-programming and multi-threading may present a challenge for DTS analysis, since they can introduce non-determinism in the instruction stream executed by a processor. In a multi-program environment, different applications (including system code) may expose different amounts of DTS. In such a scenario, the metadata for a binary can incorporate the minimum safe voltage for the application reported by voltage safety analysis, and the processor can use dynamic voltage scaling at context switch time to adjust to the minimum safe voltage for each application or system code. While an application is resident, the value corresponding to the minimum safe voltage can be stored as part of the application's context. Entry into system code, which triggers voltage scaling, can be initiated by a timer interrupt or when the running process yields control to the OS through a system call. Voltage scaling in response to a timer interrupt may be managed by the architectural support described above, and yielding control to the OS may be handled by performing voltage scaling in software as the first action of a system call.

DTS benefits may also be possible for fine-grained concurrent execution (e.g., block multithreading, SMT, etc.). For fine-grained execution, the minimum voltage of the processor is determined as the maximum of the minimum voltages reported by the analysis tool for the different threads. However, since it may not be possible to determine all possible interleavings of instructions between the threads, a minor adaptation may be needed to determine the safe minimum voltage for a thread that is agnostic to other threads' behavior. Any state that is not maintained as part of a thread's context is now assumed to have a value of X when symbolic execution is performed for an instruction belonging to the thread. All state that is part of the thread's context will be maintained, and thus, need not be set to X. This leads to a safe minimum voltage for the thread irrespective of the behavior of the other threads.

For systems that support dynamic linking, the method can be used to identify the minimum safe voltages for the caller application, the called library function, and the OS code used for performing dynamic linking. The minimum safe voltage of the processor is the maximum of the three minimum voltages. Similarly, for self-modifying code, the method can be used to identify the minimum safe voltage for each code version. The maximum of these voltages may be chosen as the safe operating point for the processor.

In other examples, DTS may also include: Design- and architecture-level optimizations that increase DTS by increasing timing slack on dynamic critical paths; Compiler- and algorithm-level optimizations that increase DTS by eliminating activity on the dynamic critical paths exercised by a workload; DTS-aware scheduling policies in multi-programmed and multithreaded settings; exploiting DTS at a finer granularity (e.g., per-phase DTS adaptation); and leveraging symbolic simulation to enable other hardware optimization and analysis techniques.

Determining Application-Specific Peak Power and Energy Requirements for Ultra-Low Power Processors ULP systems can be classified into three types based on the way they are powered. Some ULP systems are powered directly by energy harvesting (Type 1), while some are battery-powered (Type 3). Another variant is powered by a battery and uses energy harvesting to charge the battery (Type 2).

For each of the above classes, the size of energy harvesting and/or storage components determine the form factor, size, and weight. Consider, for example, a wireless sensor node. The two largest system components of a wireless sensor node that predominantly determine the overall system size and weight may be an energy harvester (e.g., solar cell) and a battery.

Going one step further, since the energy harvesting and storage requirements of a ULP system are determined by its power and energy requirements, the peak power and energy requirements of a ULP system are the primary factors that determine critical system characteristics such as size, weight, cost, and lifetime. In Type 1 systems, peak power is the primary constraint that determines system size, since the power delivered by harvesters is proportional to their size. In these systems, harvesters may be sized to provide enough power, even under peak load conditions. In Type 3 systems, peak power largely determines battery life, since it determines the effective battery capacity. As the rate of discharge increases, effective battery capacity drops. This effect is particularly pronounced in ULP systems, where near-peak power is consumed for a short period of time, followed by a much longer period of low-power sleep, since pulsed loads with high peak current reduce effective capacity even more drastically than sustained current draw.

In Type 2 and 3 systems, the peak energy requirement matters as well. For example, energy harvesters in Type 2 systems must be able to harvest more energy than the system consumes, on average. Similarly, battery life and effective capacity are dependent on energy consumption (i.e., average power). The size and weight of a ULP system may scale based on peak energy and power requirements. A tighter bound on the peak power and energy requirements of a ULP system can result in a roughly proportional reduction in size and weight.

There are several possible approaches to determine the peak power and energy requirements of a ULP processor. The most conservative approach involves using the processor design specifications provided in data sheets. These specifications characterize the peak power that can be consumed by the hardware at a given operating point and can be directly translated into a bound on peak power. This bound is conservative because it is not application-specific; however, it is safe for any application that might be executed on the hardware. A more aggressive technique for determining peak power or energy requirements is to use a peak power or energy stressmark. A stressmark is an application that attempts to activate the hardware in a way that maximizes peak power or energy. A stressmark may be less conservative than a design specification, since it may not be possible for an application to exercise all parts of the hardware at once. The most aggressive conventional technique for determining peak power or energy of a ULP processor is to perform application profiling on the processor by measuring power consumption while running the target application on the hardware. However, since profiling is performed with specific input sets under specific operating conditions, peak power or energy bounds determined by profiling might be exceeded during operation if application inputs or system operating conditions are different than during profiling. To ensure that the processor operates within its peak power and energy bounds, a guardband is applied to profiling-based results.

Most ULP embedded systems run the same application or computation over and over in a compute/sleep cycle for the entire lifetime of the system. As such, the power and energy requirements of embedded ULP processors tend to be application-specific. This is not surprising, considering that different applications exercise different hardware components at different times, generating different application-specific loads and power profiles. However, while the peak power and energy requirements of ULP processors tend to be application-specific, many conventional techniques for determining peak power and energy requirements for a processor are not application-specific (e.g., design-based and stressmark-based techniques). Even in the case of a profiling-based technique, guardbands must be used to inflate the peak power requirements observed during profiling, since it is not possible to generate bounds that are guaranteed for all possible input sets. These limitations prevent existing techniques from accurately bounding the power and energy requirements of an application running on a processor, leading to over-provisioning that increases system size and weight.

Accordingly, disclosed herein is a system and method that determines application-specific peak power and energy requirements based on hardware-software co-analysis of the application and ultra-low-power processor in an embedded system. The technique performs a symbolic simulation of an application on the processor netlist in which unknown logic values (Xs) are propagated for application inputs. This allows gates to be identified that are guaranteed to not be exercised by the application for any input. This, in turn, allows the peak power and energy requirements for the application to be bound. The peak power and energy requirements generated by the technique are guaranteed to be safe for all possible inputs and operating conditions. The technique may be fully automated and may provide more accurate, tighter bounds than conventional techniques for determining peak power and energy requirements.

Disclosed herein is an automated technique based on symbolic simulation that takes an embedded system's application software and processor netlist as inputs and determines application-specific peak power and energy requirements for the processor that are guaranteed to be valid for all possible application inputs and operating conditions. Application-specific peak power and energy requirements determined by the technique may be more accurate, and therefore less conservative, than those determined by conventional techniques. On average, the peak power requirements generated by the technique may be 27%, 26%, and 15% lower than those generated based on design specifications, a stressmark, and profiling, respectively, and the peak energy requirements generated by the technique may be 47%, 26%, and 17% lower. Reduction in the peak power and energy requirements of a ULP processor may be leveraged to improve critical system metrics such as size and weight. The technique may be used to guide optimizations that target and reduce the peak power of a processor. Optimizations of the technique may reduce peak power by up to 10% for a set of embedded applications.

Peak power may be different for different applications. Thus, peak power bounds that are not application-specific will overestimate the peak power requirements of applications, leading to over-provisioning of energy harvesting and storage components that determine system size and weight. Peak power requirements of applications may be significantly lower than the rated peak power of a chip, so using design specifications to determine peak power requirements may lead to significant over-provisioning and inefficiency. Peak power of an application depends on application inputs and may vary significantly for different inputs. This means that profiling cannot be relied on to accurately determine the peak power requirement for a processor, since not all input combinations can be profiled, and the peak power for an unprofiled input could be significantly higher than the peak power observed during profiling. Since input-induced variations may change peak power by over 25%, a profiling-based approach for determining peak power requirements should apply a guardband of at least 25% to the peak power observed during profiling.

For energy-constrained ULP systems, like those powered by batteries (Type 2 and 3), peak energy as well as peak power determines the size of energy harvesting and storage components. Thus, it is also important to determine an accurate bound on the peak energy requirements of a ULP processor. The instantaneous power profile for an application may on average be significantly lower than peak power.

Therefore, the optimal sizing of components in an energy-constrained system can more accurately be determined by generating an accurate bound on peak energy, rather than conservatively multiplying peak power by execution time.

The maximum rate at which an application can consume energy is also application- and input-dependent. Therefore, conventional techniques for determining the peak energy requirements of a ULP processor have the same limitations as conventional techniques for determining peak power requirements. In both cases, the limitations of conventional techniques require over-provisioning that can substantially increase system size and weight. Accordingly, below a technique is described for determining the peak power and peak energy requirements of a ULP processor that is application-specific yet also input-independent.

Figure 7:
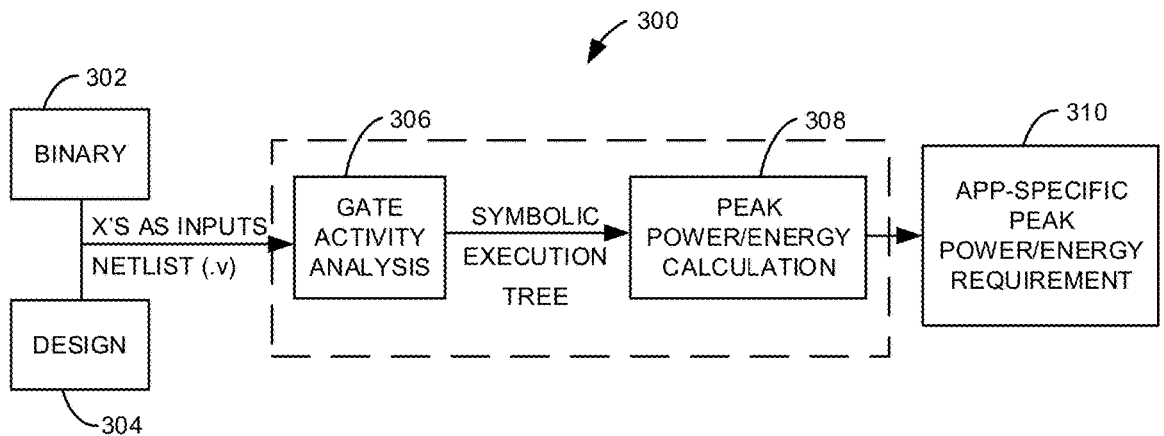
FIG. 7 illustrates one example of a process for performing input-independent activity analysis to determine peak power and energy requirements for a processor.

FIG. 7 illustrates an overview of the technique 300 for determining application-specific peak power and energy requirements that are input-independent. The inputs to the technique are the application binary (indicated at 302) that runs on a ULP processor and the gate-level netlist of the ULP processor (indicated at 304). The first phase of the technique, described in detail below, is an activity analysis at 306 that uses symbolic simulation to efficiently characterize all possible gates that can be exercised for all possible execution paths of the application and all possible inputs. This analysis also reveals which gates can never be exercised by the application. Based on this analysis, input-independent peak power and energy calculations are performed at 308 to determine the peak power and energy requirements for a ULP processor (indicated at 310).

Since the peak power and energy requirements of an application can vary based on application inputs, a technique that determines application-specific peak power requirements must bound peak power for all possible inputs. Exhaustive profiling for all possible inputs is not possible for most applications, so disclosed herein is activity analysis that uses unknown logic values (Xs) for inputs to efficiently characterize activity for all possible inputs with minimum simulation effort.

The technique, described in the pseudocode below, is based on symbolic simulation of an application binary running on the gate-level netlist of a processor, in which Xs are propagated for all signal values that cannot be constrained based on the application. When the simulation begins, the states of all gates and memory locations that are not explicitly loaded with the binary are initialized to Xs. During simulation, all input values are replaced with Xs by the simulator. As simulation progresses, the simulator dynamically constructs an execution tree describing all possible execution paths through the application. If an X symbol propagates to the inputs of the program counter (PC) during simulation, indicating an input-dependent control sequence, a branch is created in the execution tree. Normally, the simulator pushes the state corresponding to one execution path onto a stack for later analysis and continues down the other path. However, a path is not pushed to the stack or re-simulated if it has already been simulated (i.e., if the simulator has seen the branch (PC) before and the processor state is the same as it was when the branch was previously encountered). This allows the analysis of programs with input-dependent loops. When simulation down one path reaches the end of the application, an un-simulated state is loaded from the last input-dependent branch in depth-first order, and simulation continues. When all execution paths have been simulated to the end of the application (i.e., depth-first traversal of the control flow graph terminates), activity analysis is complete.

During symbolic simulation, the simulator captures the activity of each gate at each point in the execution tree. A gate is considered active if its value changes or if it has an unknown value (X) and is driven by an active gate; otherwise, the gate is idle. The resulting annotated symbolic execution tree describes all possible instances in which a gate could possibly toggle for all possible executions of the application binary. As such, a gate that is not marked as toggled at a particular location in the execution tree can never toggle at that location in the application. As described below, the information gathered during activity analysis can be used to bound the peak power and energy requirements of an application.

Input-Independent Gate Activity Analysis Pseudocode

```
1.  Procedure Create Symbolic Execution Tree(app_binary, design_netlist)
2.  Initialize all memory cells and all gates in design_netlist to X
3.  Load app_binary into program memory
4.  Propagate reset signal
5.  s ← State at start of app_binary
6.  Symbolic Execution Tree T.set_root(s)
7.  Stack of un-processed execution paths, U.push(s)
8.  while U != Ø do
9.      e ← U.pop( )
10.     while e.PC_next != X and !e.END do
11.         e.set_inputs X( ) // set all peripheral port inputs to Xs
12.         e' ← propagate gate values(e) // simulate this cycle
13.         e.annotate_gate_activity(e,e') // annotate activity in tree
14.         e.add_next_state(e') // add to execution tree
15.         e ← e' // process next cycle
16.     end while
17.     if e.PC_next == X then
18.         for all a ∈ possible_PC_next_vals(e) do
19.             if a ∉ T then
20.                 e' e.update_PC next(a)
21.                 U.push(e')
22.                 T.insert(a)
23.             end if
24.         end for
25.     end if
26. end while
```

The input to the second phase of the technique is the symbolic execution tree generated by input-independent gate activity analysis. The pseudocode below describes how to use the activity-annotated execution tree to generate peak power requirements for a ULP processor, application pair.

The first step in determining peak power from an execution tree produced during gate activity analysis is to concatenate the execution paths in the execution tree into a single execution trace. A value change dump (VCD) file may be used to record the gate-level activity in the execution trace. The execution trace contains Xs, and the goal of the peak power computation is to assign values to the Xs in the way that maximizes power for each cycle in the execution trace. The power of a gate in a particular cycle is maximized when the gate transitions (toggles). Since a transition involves two cycles, maximizing dynamic power in a particular cycle, c, of the execution trace involves assigning values to any Xs in the activity profiles of the current and previous cycles, c and c−1, to maximize the number of transitions in cycle c.

Input-Independent Peak Power Computation Pseudocode

Figure 8:
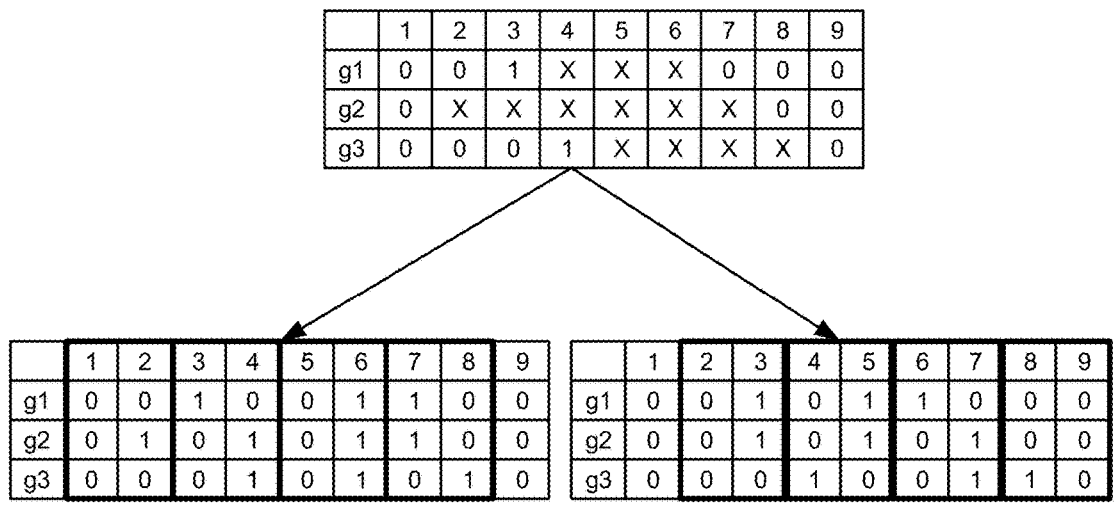
FIG. 8 illustrates two different activity profiles including one that maximizes power in even cycles and one that maximizes power in odd cycles.

An example of VCD generation is illustrated in FIG. 8. The example of three gates with overlapping Xs that need to be assigned to maximize power in every cycle is used. Two assignments are shown—one that maximize peak power in all even cycles (left), and one that maximizes peak power in all odd cycles (right). Assuming, for the sake of example, that all gates have equal power consumption and that the 0→1 transition consumes more power than the 1→0 transition for these gates, the highest possible peak power for this example happens in cycle 6 in the "even" activity trace, when all the gates have a 0→1 transition.

The technique generates a per-cycle peak power trace characterizing all possible execution paths of an application. The peak power trace may be used to generate peak energy requirements. Since per-cycle peak power varies significantly over the compute phases of an application, peak energy can be significantly lower than assuming the maximum peak energy (i.e., peak power*clock period*number of cycles). Instead, the peak energy of an application is bounded by the execution path with the highest sum of per-cycle peak power multiplied by the clock period. To

```
1.  Procedure Calculate Peak Power
2.  {E—O}_VCD ← Open {Even—Odd} VCD File // maximizes peak power in even—odd
    cycles
3.  T ← flatten(Execution Tree) // create a flattened execution trace that represents the
    execution tree
4.  for all {even—odd} cycles c ∈ T do
5.      for all toggled gates g ∈ c do
6.          if value(g,c) == X && value(g,c−1) == X then
7.              value(g,c−1) ← maxTransition(g,1) // returns the value of the gate in
                the first cycle of the gate's maximum power transition
8.              value(g,c) ← maxTransition(g,2) // returns the value of the gate in the
                second cycle of the gate's maximum power transition
9.          else if value(g,c) == X then
10.             value(g,c) ← !value(g,c−1)
11.         else if value(g,c−1) == X then
12.             value(g,c−1) ← !value(g,c)
13.         end if
14.     end for
15.     {E—O}_VCD ← value(*,c−1)
16.     {E—O}_VCD ← value(*,c)
17. end for
18. Perform power analysis using E_VCD and O_VCD to generate even and odd power
    traces, $P_E$ and $P_O$
19. Interleave even cycle power from $P_E$ with odd cycle power from $P_O$ to form peak power
    trace, $P_{peak}$
20. peak power ← max($P_{peak}$)
```

The number and power of transitions may be maximized as follows. When the output value of a gate in only one of the cycles, c or c−1, is an X, the X is assigned the value that assumes that a transition happened in cycle c. When both values are Xs, the values are assigned to produce the transition that maximizes power in cycle c. The maximum power transition is found by a look-up into the standard cell library for the gate. Since constraining Xs in two consecutive cycles to maximize power in the second cycle may not maximize power in the first cycle, two separate VCD files are produced—one that maximizes power in all even cycles and one the maximizes power in all odd cycles. To find the peak power of the application, activity-based power analysis may be run on the design using the even and odd VCD files to generate even and odd power traces. A peak power trace is then formed by interleaving the power values from the even cycles in the even power trace and the odd cycles in the odd power trace. This peak power trace bounds the peak power that is possible in every cycle of the execution trace. The peak power requirement of the application is the maximum percycle power value found in the peak power trace.

avoid enumerating all execution paths, several techniques may be used. For an input-dependent branch, peak energy is computed by selecting the branch path with higher energy. For a loop whose number of iterations is input-independent, peak energy can be computed as the peak energy of one iteration multiplied by the number of iterations. For cases where the number of iterations is input-dependent, the maximum number of iterations may be determined either by static analysis or user input. If neither is possible, it may not be possible to compute the peak energy of the application; however, this is uncommon in embedded applications.

Since the technique is able to associate the input-independent peak power consumption of a processor with the particular instructions that are in the pipeline during a spike in peak power, the tool may be used to identify which instructions or instruction sequences cause spikes in peak power. The technique may also provide a power breakdown that shows the power consumption of the microarchitectural modules that are exercised by the instructions. These analyses may be combined to identify which instructions executing in which modules cause power spikes. After identifying the cause of a spike, software optimizations may be used to target the instruction sequences that cause peaks and replace them with alternative sequences that generates less instantaneous activity and power while maintaining the same functionality. After optimizing software to reduce a spike in peak power, the peak power analysis technique may be re-run to determine the impact of optimizations on peak power. Guided by the technique, it may be chosen to apply only the optimizations that are guaranteed to reduce peak power.

The technique is more accurate than application-oblivious techniques such as determining peak power requirements from a stressmark or design specification, because an application constrains which parts of the processor can be exercised in a particular cycle. The technique also provides a more accurate bound than a guardbanded input-based peak power requirement, because it does not require a guardband to account for the non-determinism of input-based profiling. By accounting for all possible inputs using symbolic simulation, the technique can bound peak power and energy for all possible application executions without guardbanding. The peak power requirements reported by the technique may be 15% lower than guardbanded application-specific requirements, 26% lower than guardbanded stressmark-based requirements, and 27% lower than design specification-based requirements, on average.

The technique also provides more accurate bounds on peak energy than conventional techniques, partly because of the reasons mentioned above, and also because the technique is able to characterize the peak energy consumption in each cycle of execution, generating a peak energy trace that accounts for dynamic variations in energy consumption.

As described above, more accurate peak power and energy requirements may be leveraged to reduce critical ULP system parameters like size and weight. For example, reduction in a Type 1 system's peak power requirements allows a smaller energy harvester to be used. System size is roughly proportional to harvester size in Type 1 systems. In Type 2 systems, it is the peak energy requirement that determines the harvester size; reduction in peak energy requirement reduces system size roughly proportionally. Since required battery capacity depends on a system's peak energy requirement, and effective battery capacity depends on the peak power requirement, reductions in peak power and energy requirements both reduce battery size for Type 2 and 3 systems.

A ULP system may contain other components, such as transmitter/receiver, ADC, DAC, and sensor(s), along with the processor. All of these components may contribute to the system's peak power and energy, and hence, the sizing of the harvester and battery. As discussed above, the technique may be used to guide application-level optimizations that reduce peak power. Below, three software optimizations are described that may be applied to applications to reduce peak power. The optimizations may be derived by analyzing a processor's behavior during the cycles of peak power consumption. This analysis involves (a) identifying instructions in the pipeline at the peak, and (b) identifying the power contributions of the microarchitectural modules to the peak power to determine which modules contribute the most.

The first optimization aims to reduce a peak by "spreading out" the power consumed in a peak cycle over multiple cycles. This is accomplished by replacing a complex instruction that induces a lot of activity in one cycle with a sequence of simpler instructions that spread the activity out over several cycles.

The second optimization aims to reduce the instantaneous activity in a peak cycle by delaying the activation of one or more modules, previously activated in a peak cycle, until a later cycle. For this optimization, the focus is on the POP instruction, since it generates peaks in some applications. The peaks are caused since a POP instruction generates high activity on the data and address buses and simultaneously uses the incrementer logic to update the stack pointer. To reduce the peak, the POP instruction is broken down into two instructions—one that moves data from the stack, and one that increments the stack pointer.

The third optimization is based on the observation that for some applications, peak power is caused by the multiplier (a high-power peripheral module) being active simultaneously with the processor core. To reduce peak power in such scenarios, a NOP is inserted into the pipeline during the cycle in which the multiplier is active.

The three optimizations that may be applied to applications to reduce peak power are summarized below.

Register-Indexed Loads (OPT 1): A load instruction (MOV) that references the memory by computing the address as an offset to a register's value involves several microoperations—source address generation, source read, and execute. Breaking the micro-operations into separate instructions can reduce the instantaneous power of the load instruction. The ISA already provides a register indirect load operation where the value of the register is directly used as the memory address instead of as an offset. Using another instruction (such as an ADD or SUB), the correct address can be computed and stored into another register. The second register can be used to execute the load in register indirect mode.

```
OPT 1:
mov &0x013a, r15 ;
pop r2 ;
becomes:
mov &0x013a, r15
mov #0, r9
mov @r1, r2
add #2, r15
```

POP instructions (OPT 2): The micro-operations of a POP instruction are (a) read value from address pointed to by the stack pointer, and (b) increment the stack pointer by two. POP is emulated using MOV @SP+, dst. This can be broken down to two instructions—MOV @SP, dst and ADD #2, SP.

```
OPT 2:
mov &0x013a, r15 ;
pop r2 ;
becomes:
mov &0x013a, r15
mov #0, r9
mov @r1, r2
add #2, r1
```

Multiply (OPT 3): The multiplier is a peripheral in open-MSP430. Data is MOVed to the inputs of the multiplier and then the output is MOVed back to the processor. For a 2-cycle multiplier, all moving of data can be done consecutively without any waiting. However, this involves a high power draw, since there will be a cycle when both the multiplier and the processor are active. This can be avoided by adding a NOP between writing to and reading from the multiplier.

```
OPT 3:
mov −6(r4) , &0x0132
mov −4(r4) , &0x0138
mov 0x013a, r15
becomes:
mov −6(r4) , &0x0132
mov −r(r4) , &0x0138
nop
mov 0x013a, r15
```

The techniques may be applied in the context of ULP processors that are already the most widely-used type of processor and are also expected to power a large number of emerging applications. Such processors also tend to be simple, run relatively simple applications, and do not support non-determinism (no branch prediction and caching). This makes the symbolic simulation-based technique a good fit for such processors. Below, it is discussed how the technique may scale for complex processors and applications, if necessary.

More complex processors contain more performance-enhancing features such as large caches, prediction or speculation mechanisms, and out-of-order execution that introduce non-determinism into the instruction stream. Co-analysis is capable of handling this added non-determinism at the expense of analysis tool runtime. For example, by injecting an X as the result of a tag check, both the cache hit and miss paths will be explored in the memory hierarchy. Similarly, since co-analysis already explores taken and not-taken paths for input-dependent branches, it can be adapted to handle branch prediction. In an out-of-order processor, the ordering of instructions is based on the dependence pattern between instructions. Thus, extending input-independent CFG exploration to also explore the data flow graph (DFG) may allow analysis of out-of-order execution.

In other application domains, there exist applications with more complex CFGs. For more complex applications, heuristic techniques may be used to improve scalability of hardware-software co-analysis. While heuristics have been applied to improve scalability in other contexts (e.g., verification), heuristics for hardware-software co-analysis must be conservative to guarantee that no gate is marked as untoggled when it could be toggled.

In a multi-programmed setting (including systems that support dynamic linking), the union of the toggle activities of all applications (caller, callee, and the relevant OS code in case of dynamic linking) is taken to get a conservative peak power value. For self-modifying code, peak power for the processor would be chosen to be the peak of the code version with the highest peak. In case of fine-grained multi-threading, any state that is not maintained as part of a thread's context is assumed to have a value of X when symbolic execution is performed for an instruction belonging to the thread. This leads to a safe guarantee of peak power for the thread, irrespective of the behavior of the other threads.

The technique naturally handles state machines that run synchronously with the microcontroller. For state machines that run asynchronously (e.g., ADCs, DACs, bus controllers), the worst-case power at any instant is assumed by separately analyzing the asynchronous state machine to compute peak power and energy and adding the values to those of the processor. Asynchronous state machines are generally much smaller than the actual processor, allowing this to not be overly conservative.

A similar approach can be used to handle interrupts. I.e., offset the peak power with the worst power consumed during interrupt detection. The effect of an asynchronous interrupt can be characterized by forcing the interrupt pin to always read an X. Since this can potentially cause the PC to be updated with an X, the PC update logic can be forced to ignore the interrupt handling logic's output. This is achieved by monitoring a particular net in the design and forcing it to zero every time its value becomes X. Interrupt service routines (ISRs) are regular software routines and can be analyzed with the rest of the code.

Enabling Effective Module-Oblivious Power Gating for Embedded Processors

Disclosed herein is aggressive power gating based on module-oblivious power domains. A module-oblivious power domain is an arbitrary set of gates that have correlated activity. Module-oblivious power domains may contain only a subset of gates in a module, may contain gates from multiple modules, and may also consist of logic from non-microarchitectural modules (e.g., uncore, debug logic, peripherals, etc.). The goal of grouping logic into module-oblivious power domains based on correlated activity rather than module membership is to enable larger segments of logic to be power gated for longer periods of time, thus saving more energy.

While module-oblivious power domains may provide more opportunities to reduce power, conventional hardware and software-based power management techniques cannot manage these unconventional domains. A hardware or software-based power gating management technique must be able to guarantee that a domain is idle before it is powered off and that an idle domain is powered on before it will be used. Since the activity of an arbitrary collection of gates that may constitute portions of multiple modules cannot be inferred based on software alone, module-oblivious domains cannot be managed in software using conventional techniques. Hardware-based power management detects when a domain is idle, then powers off the domain. Since a module-oblivious domain is not encapsulated with a well-defined port list and does not have a well-defined function but instead consists of an arbitrary collection of gates that can contribute to many different functionalities, detecting when the domain is idle requires monitoring of all input nets to the gates in the domain. The high overhead of monitoring the activity of so many signals easily outweighs the benefits of power gating. Any viable technique for managing module-oblivious power domains must be able to infer the gate-level activity induced by software, so that the prohibitive overheads associated with hardware monitoring of an arbitrary set of gates can be avoided.

Disclosed herein is a technique that generates safe, aggressive power gating management decisions for module-oblivious power domains. The gate-level activity profile of an application is captured through a symbolic simulation of the application's binary that characterizes domain activity for all possible application inputs. Safe power gating decisions are then generated such that each domain is guaranteed to be powered on by the time it is used, and domains are aggressively powered off whenever profitable. Power gating decisions are then embedded into the application binary. This software-based power management approach avoids the prohibitive overheads of managing module-oblivious domains in hardware.

The technique may be automated, may require no programmer intervention, and incurs low management overhead. Also, while the technique is general, it is best suited for embedded systems. Embedded system designers routinely perform hardware/software codesign or license hardware IP, so they often have access to both RTL and software binary—the inputs needed by the power gating framework. Also, embedded processors and applications tend to be simple, so the symbolic simulation-based analysis scales well in such settings. It is noted that module-oblivious power gating may result in 2× higher leakage energy savings compared to state-of-the-art module-based power gating. To enable module-oblivious power gating, a fully-automated technique may be used that performs co-analysis of an embedded system's processor netlist and application binary to make safe, aggressive power gating decisions.

There are several reasons why module-oblivious power domains may provide significantly more opportunities for power gating than module-based domains in microprocessors. One reason is that logic in microarchitectural modules is grouped together largely based on functionality or position in the processor pipeline, which does not necessarily imply correlation in terms of activity. It may often be the case that different logic partitions within the same microarchitectural module have very different activity profiles. For example, many microarchitectural modules support "one-hot" logic. This implies that each logical state is mutually exclusive of all other states. Similarly, each instruction selects and executes on one execution unit. This leaves all other execution units idle. Furthermore, it is common for several modules to have parts that are nearly always active and other parts that are nearly always idle. This weak or anti-correlation between the activity profiles of different parts within a module limits the effectiveness of power gating for module-based domains. Uncorrelated activity within modules and correlated activity across modules indicates that there may be significant opportunities to perform more aggressive power gating with module-oblivious power domains.

Another reason for correlated activity across module boundaries is that logic in one module often drives logic in another module. Although the entire modules are unlikely to have correlated activity, the driving and driven parts of the modules do have highly correlated activity. Also, such logical components are typically in close proximity in a chip layout, making them good candidates to be placed in the same domain for power gating.

It is noted that not all parts of a module have correlated activity, and in many cases, different parts of the same module have highly uncorrelated activity. This suggests that module-based power domains may often miss opportunities to power gate idle logic, whereas module-oblivious power domains may provide significantly more opportunities to power gate larger areas of logic for longer periods of time.

Reaping the power benefits enabled by module-oblivious domains requires a power domain management technique that can determine when domains are idle/active and power them off/on accordingly. Unfortunately, existing techniques that manage module-based domains through software or hardware cannot be used for module-oblivious domains. Consider existing software-based management techniques. Software-based management is possible when domain activity can be inferred from software, as is the case for many module-based domains. For a module-oblivious domain, however, it is not possible to infer domain activity from software alone. A module-oblivious domain does not have a well-defined architectural function. It is a collection of gates with correlated activity profiles that may belong to many modules and contribute to many functionalities.

Similarly, existing hardware-based domain management techniques are infeasible for module-oblivious domains. Hardware-based domain management dynamically determines when a power domain is idle/active based on processor control signals. This can be relatively straightforward for module-based designs, since RTL modules are encapsulated, with a well-defined interface (port list) and functional description.

On the other hand, domain management logic for a module-oblivious domain is not simple. Since module-oblivious domains are not nicely encapsulated with a well-defined interface and function, the only way to infer their activity in hardware is to monitor activity on all input nets that cross the domain boundary. Additionally, state elements (flip-flops) inside the domain must be monitored for activity, since a state machine inside the domain could be active even without triggering any activity at the domain boundary.

The overhead of managing module-oblivious domains in hardware becomes prohibitive when the full processor is considered. The overheads preclude any possible benefits from aggressive power gating, prohibiting the use of hardware-based domain management for module-oblivious power gating. Any viable technique for managing module-oblivious power domains must be based on inferring their gate-level activity from software, such that the prohibitive overheads associated with hardware-based monitoring of an arbitrary set of gates can be avoided. Below, a low-overhead technique based on hardware-software co-analysis is described that can infer the activity of module-oblivious domains to enable aggressive module-oblivious power gating.

A power domain management technique must infer domain activity to determine when domains can be powered off, while guaranteeing that that they will be powered on when active. Since a module-oblivious domain may contain an arbitrary set of gates, inferring domain activity requires gate-level analysis of software execution on a processor. Activity analysis cannot be based on profiling (i.e., observing activity for several benchmark runs with different input sets), since profiling is input-specific and may result in incorrect management decisions when in-field inputs are different than the inputs characterized during profiling. An incorrect management decision is unacceptable, since it may lead to incorrect program execution (e.g., when a domain needed by the program is turned off).

Figure 9:
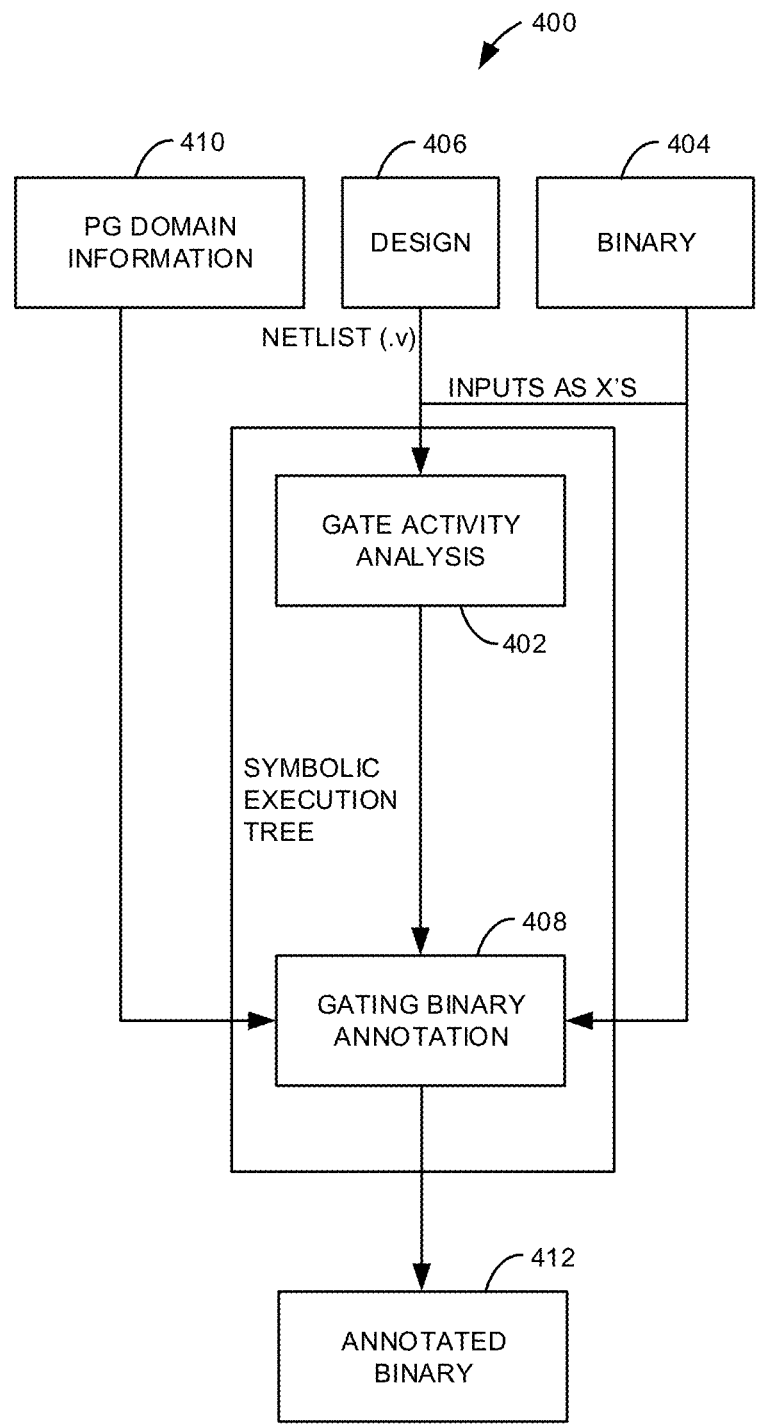
FIG. 9 illustrates generating input-independent power gating decisions for module-oblivious power domains.

Below, a technique is described that uses symbolic simulation to characterize the gate-level activity of an application on a processor to generate power gating decisions for module-oblivious power domains. The symbolic simulation uses unknown logic values (Xs) for all inputs so that the generated activity profile characterizes all possible executions of the application for all possible inputs. The results of input-independent activity analysis is used to generate instruction-level power domain management decisions that achieve near-optimal power benefits while guaranteeing that all domains are powered on whenever needed. FIG. 9 illustrates an overview of the module-oblivious power gating technique 400.

The first stage of the module-oblivious domain management technique at 402 infers the activity of power domains during an application's execution. Normally, a gate-level simulation could infer the activity of all processor gates for only one input set. However, the technique propagates Xs for all application inputs, allowing inferring of the activity of all gates for all possible input sets. Combined with the domain mapping that specifies which gates belong to each domain, domain activity can be inferred for all possible executions of an application on a processor.

Gate Activity Analysis 402 described in the pseudocode below performs symbolic simulation of an application binary (indicated at 404) running on the gate-level netlist of the processor (indicated at 406), in which unknown logic values (Xs) are propagated for all signal values that cannot be constrained based on the application. When the simulation begins, the states of all gates and memory locations that are not explicitly loaded with the binary are initialized to Xs. During simulation, all input values are replaced with Xs. As simulation progresses, the simulator dynamically constructs an execution tree describing all possible execution paths through the application. If an X symbol propagates to the inputs of the program counter (PC) during simulation, indicating an input-dependent control sequence, a branch is created in the execution tree. Normally, the simulator pushes the state corresponding to one execution path onto a stack for later analysis and continues down the other path. However, a path is not pushed to the stack or re-simulated if it has already been simulated (i.e., if the simulator has seen the branch (PC) before and the processor state is the same as it was when the branch was previously encountered). This allows the process to analyze programs with input-dependent loops. When simulation down one path reaches the end of the application, an un-simulated state is loaded from the last input-dependent branch in depth-first order, and simulation continues. When all execution paths have been simulated to the end of the application (i.e., depth-first traversal of the control flow graph terminates), Gate Activity Analysis is complete.

During symbolic simulation, the simulator captures the activity of each gate at each point in the execution tree. A gate is considered active in a particular cycle if its value changes or if it has an unknown value (X) and is driven by an active gate; otherwise, the gate is idle. The resulting annotated symbolic execution tree describes all possible instances in which a gate could possibly toggle (and by extension, all instances in which each domain could possibly be active) for all possible executions of the application. As such, it also describes when power domains (even module-oblivious domains) can be safely powered down and when they must be powered up. The inferred domain activity information is then translated into domain management decisions.

Input-Independent Gate Activity Analysis Pseudocode

```
1.  Procedure Create Symbolic Execution Tree(app_binary, design_netlist)
2.  Initialize all memory cells and all gates in design_netlist to X
3.  Load app_binary into program memory
4.  Propagate reset signal
5.  s ← State at start of app_binary
6.  Symbolic Execution Tree T.set_root(s)
7.  Stack of un-processed execution paths, U.push(s)
8.  while U != Ø do
9.      e ← U.pop( )
10.     while e.PC_next != X and !e.END do
11.         e.set_inputs X( ) // set all peripheral port inputs to Xs
12.         e' ← propagate gate values(e) // simulate this cycle
13.         e.annotate_gate_activity(e,e') // annotate activity in tree
14.         e.add_next_state(e') // add to execution tree
15.         e ← e' // process next cycle
16.     end while
17.     if e.PC_next == X then
18.         for all a ∈ possible_PC_next_vals(e) do
19.             if a ∉ T then
20.                 e' e.update_PC next(a)
21.                 U.push(e')
22.                 T.insert(a)
23.             end if
24.         end for
25.     end if
26. end while
```

Gating Binary Annotation (GBA) 408 takes as input the annotated symbolic execution tree from Gate Activity Analysis 402, gate-to-domain mapping information (indicated at 410), and domain wake-up overheads, and produces a binary (indicated at 412) in which each static instruction is annotated with power gating decisions for all domains in the processor. The pseudocode below describes GBA. GBA considers each path through the symbolic execution tree. During each cycle of a path's execution, GBA determines which domains can have active gates and thus must be powered on. To ensure safety, GBA also marks a domain as active during the N cycles leading up to a period of activity, where N is the wakeup latency required to power up the domain. These cycle-level power gating decisions are mapped to all the static instructions that have dynamic instances in the pipeline during the wakeup cycles or the current cycle.

Gating Binary Annotation for Power Gating Control Pseudocode

```
Procedure Annotate Binary with PG Decisions(annotated_symbolic_execution_tree,
domain_mapping, domain_wakeup_overhead)
  1.    P_SET ← enumerate all paths in annotated_symbolic_execution_tree
  2.    Mark all domains as idle for all instructions/addresses in the binary
  3.    foreach path p ∈ P_SET do
  4.         foreach cycle c ∈ p do
  5.              foreach gate g ∈ Processor do
  6.                   if g is toggled then
  7.                        D ← domain mapping.get_domain(g)
  8.                        wo ← domain wakeup_overhead.get(D)
  9.                        I ← get_instructions_being_executed(p, c, wo)
 10.                        foreach i ∈ I do
 11.                             Mark domain D as active at instruction i in binary
 12.                        end for
 13.                   end if
 14.              end for
 15.         end for
 16.    end for
```

Once GBA has considered each execution path through an execution binary, each static instruction has an annotation specifying which domains must be powered on when the instruction is in the decode stage. This annotation guarantees safety, because each possible dynamic instance of a static instruction is considered by GBA. If a domain is marked as being powered on for any dynamic instance of a static instruction, the static instruction is annotated with an "ON" decision for the domain. This is conservative to ensure safety, but it works well for embedded applications, which tend to have simple control flow. If a domain is not active for any dynamic instance of a particular instruction (even considering wakeup overheads), the domain is powered off. The annotated binary containing domain management decisions can be used to manage power domains using one of the several techniques.

Figure 10:
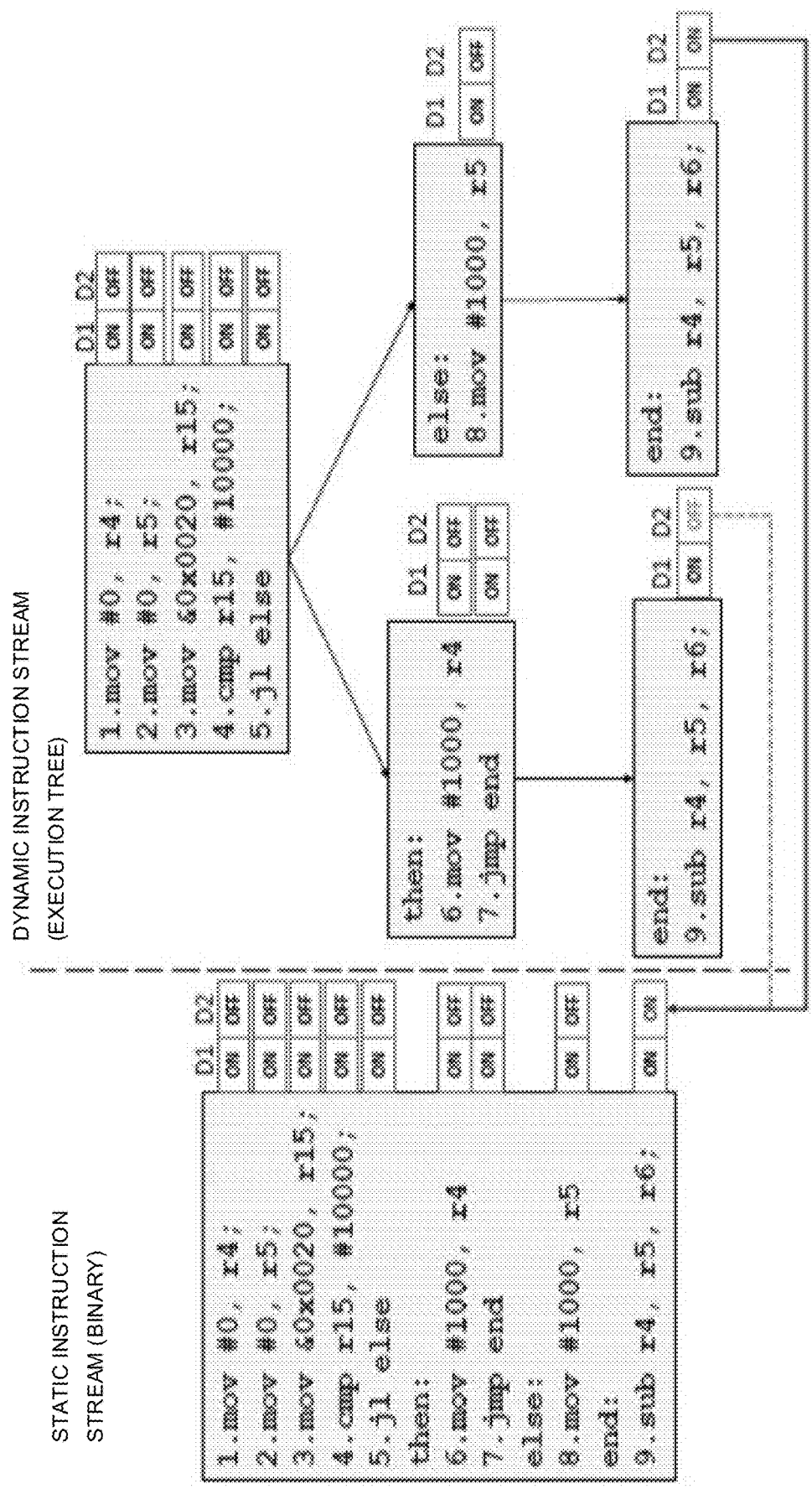
FIG. 10 is an illustration of Gating Binary Annotation for an example code (an if-else block).

FIG. 10 illustrates that the technique based on hardware-software co-analysis can infer the activity of module-oblivious domains, which was impossible to infer from software alone. For simplicity, each instruction is shown as taking a single cycle, only domain-level activity is shown, and a wake-up latency of zero cycles is used.

FIG. 10 shows the annotated symbolic execution tree generated by Gate Activity Analysis (GAA). GAA simulates the application starting at instruction 1. When an input value is read in instruction 3, instead of storing the input bits, unknown logic values (Xs) are stored in r15. During instruction 5, an X propagates to the PC inputs, since the result of the comparison in instruction 4 is unknown (X). At this point, a branch is created, and the simulation state is stored in a stack for later analysis with the address of instruction 8 (else:) in the PC inputs. Simulation continues through the left (then:) control flow path to completion, starting with instruction 6. After finishing instruction 9, the stored simulation state is popped off the stack and the right control flow path is simulated to completion, starting with instruction 8.

During simulation, GAA annotates each dynamic instruction with domain activity for each domain (D1 and D2 in FIG. 10). ON means that at least one gate in the domain might be active during that instruction; OFF means that all of the domain's gates are guaranteed to be inactive for that instruction. Next, Gating Binary Annotation (GBA) maps the domain states (ON/OFF states) from the symbolic execution tree to the static instructions in the application binary. Consider static instruction 1 (mov #0, r4). There is only one dynamic instance of the instruction in the symbolic execution tree, and for this instance, domain D1 is ON and D2 is OFF. Therefore, GBA annotates the corresponding static instruction with the information that D1 is ON and D2 is OFF.

Now consider static instruction 9 (sub, r4, r5, r6). There are two dynamic instances of the instruction in the symbolic execution tree. The activity of D1 is consistent across the two instances (D1 is ON for both); therefore, GBA annotates the static instruction with the information that D1 is ON. The activity of D2, however, is not consistent across the two dynamic instances of instruction 9; D2 is OFF in one and ON in the other. In this case, GBA conservatively resolves the conflict by marking D2 as ON in the static instruction annotation. This ensures safety for all possible application executions. Microarchitectural support may be used for communicating domain management decisions to the control logic that powers the domains off and on.

A straightforward way to generate power gating control signals is to insert instructions in the binary that direct power domains when to turn off and on. To ensure that a power domain is powered on before it is used, the wakeup instruction for a domain must arrive wakeup-latency cycles before an instruction, IA, that will activate the domain. For an in-order processor, the wakeup instruction wakeup-latency instructions is inserted ahead of IA. This guarantees that the domain will be powered up even if instructions have variable latencies. A power down instruction for a domain is inserted immediately after the last instruction that specifies that the domain must be powered on. Since GBA marks domains as active (ON) during their entire wakeup and activity period, the wakeup instruction is simply inserted before the first instruction that marks a domain as ON, and the power down instruction is inserted after the last instruction that marks a domain as ON. For example, in FIG. 10 an instruction that turns D1 ON and D2 OFF is inserted before instruction 1, while an instruction to turn D2 ON is inserted before instruction 9.

Another option for indicating when domains should be powered on and off is to modify the ISA of the processor to reserve some bits in the instruction to indicate the ON/OFF state of each domain. The number of bits required is equal to the number of domains. The main benefit of this technique is that it does not require extra instructions to be inserted in the binary. However, since the number of bits that can be reserved in the instruction for power gating would likely be small, this technique may only support a small number of power domains. Also, reserving instruction bits for power-gating decisions may increase code size if the instruction length must be increased to accommodate the bits.

Another alternative is to maintain a software-populated table that holds the addresses of annotated instructions, along with corresponding information about which domains should be turned ON or OFF when that instruction's address enters the PC. Every N instructions, the application populates the table with the addresses of annotated instructions in the next window of N instructions. When the PC matches one of the addresses in the table, the power domain control signals stored in that table entry are sent to the respective power domains to switch them on or off. This technique requires some software overhead to re-populate the table and hardware overhead to implement the table as a CAM.

While low-power processors used by numerous embedded applications are primarily targeted, module-oblivious power gating can be applied in other contexts as well. More complex processors contain more performance-enhancing features such as large caches, prediction or speculation mechanisms, and out-of-order execution, that introduce non-determinism into the instruction stream. Co-analysis is capable of handling this added non-determinism at the expense of analysis tool runtime. For example, by injecting an X as the result of a tag check, both the cache hit and miss paths will be explored in the memory hierarchy. Similarly, since co-analysis already explores taken and not-taken paths for input-dependent branches, it can easily be adapted to handle branch prediction.

Although out-of-order execution appears to execute instructions in a non-deterministic order, the ordering of instructions is actually deterministic, based on the dependence pattern between instructions. While instructions may execute in different orders depending on the state of pipelines and schedulers, a processor that starts from a known reset state and executes the same piece of code will transition through the same sequence of states each time. Thus, modifying input-independent CFG exploration to perform input-independent exploration of the data flow graph (DFG) may allow analysis to be extended to out-of-order execution.

Multi-programming and multi-threading present challenges for application analysis, since they introduce non-determinism in the instruction stream executed by a processor. Since it may not be possible to determine all possible interleavings of instructions between threads, a minor adaptation to the process may be needed to perform co-analysis for a thread that is agnostic to the behavior of other threads. Any state that is not maintained as part of a thread's context can be assumed to have a value of X when symbolic execution is performed for an instruction belonging to the thread. This approach generates safe power gating decisions for the thread irrespective of the behavior of the other threads.

Software-based power gating techniques may have issues with binary compatibility due to inserted power gating instructions. This can be addressed by maintaining and distributing the un-instrumented binary and running a one-time co-analysis to tailor the binary for a specific processor.

While many low-power microprocessors and a large segment of embedded systems are bare-metal systems (application running on the processor without an operating system (OS)), use of an OS is common in several embedded application domains, as well as in more complex systems. In such systems, system code must be analyzed in addition to application code to identify power gating opportunities. For relatively simply OSes (e.g., embedded and realtime OSes), it may be possible to completely analyze and annotate the OS using GAA+GBA. In some settings, it may not be possible to analyze system code completely. One solution to guarantee safety of power gating decisions in such settings is to save the domain state as part of the application context, turn on all domains before entering system mode, and return to the saved state when returning to user mode. The performance impact of wakeup overhead during a context switch should be small in such settings since OS invocations are relatively infrequent and wakeup latency is negligible compared to the time between context switches.

Module-based domains are constructed following the conventional approach for aggressive power gating, in which power domains are formed to encompass microarchitectural modules. When the number of modules is greater than the number of allowable power domains, modules are grouped together into domains using hierarchical agglomerative clustering. This clustering technique combines a set of N clusters into N−1 clusters, based on an optimization objective. In this case, the objective function uses activity profiles for the clusters (obtained from benchmark profiling) to determine which combination of modules maximizes the potential energy savings achieved by power gating the resulting domains. Potential energy savings are measured in gated cycles, where one gated cycle corresponds to power gating one gate in the gate-level netlist for one cycle.

For Module-oblivious Domains, the same clustering technique as for module-based domains are used, with two key differences. First, whereas module-based domain construction begins with all processor modules in separate clusters and combines clusters using hierarchical agglomerative clustering to form the desired number of domains, module-oblivious domain construction begins with every gate in a separate cluster and combines clusters to form the desired number of domains. Since a gate may end up in a cluster containing gates from other modules, the resulting domains are module-oblivious. Second, since an application's in-field inputs may not always match the inputs used during profiling, activity profiles produced by input-independent gate activity analysis are used to identify correlated gates and generate power domains, instead of profiles captured assuming specific inputs. An X in an activity profile is treated as a toggle, since it indicates that a net could toggle for some possible input. Input-independent domain formation ensures robustness of domains across variations in an application's input set. Domains may be formed using activity profiles that are representative of a system's target workloads.

Power gating module-oblivious domains may provide significant benefits over conventional module-based domains. On average, power gating on module-oblivious domains may provide 1.4× more leakage savings than the maximum savings that can be achieved with module-based domains and 2× more savings than hardware-based management of module-based domains.

Module-based domains do not account for the fact that different parts of the same microarchitectural modules may have uncorrelated activity profiles; as a result, they provide fewer opportunities for power gating. A single sub-module (even a single gate) with high activity or uncorrelated idle times can sabotage power gating opportunities for an entire domain. By forming domains that contain logic from different modules with similar activity profiles, module-oblivious domains do not allow more active logic to ruin power gating opportunities for less active logic in the same module.

Figure 11:
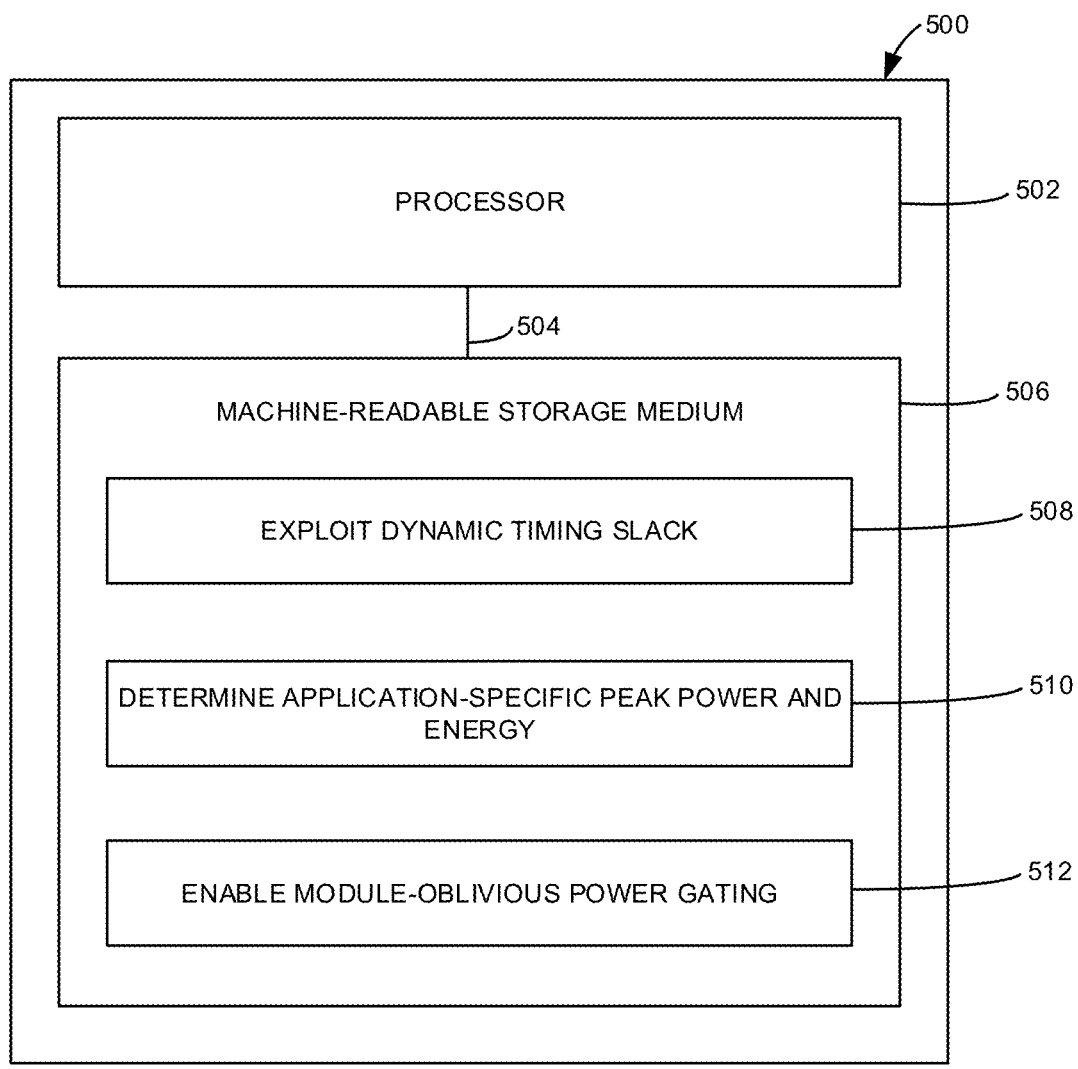
FIG. 11 is a block diagram illustrating one example of a processing system for determining power savings in processors.

FIG. 11 is a block diagram illustrating one example of a processing system 500 for determining power savings in processors. System 500 includes a processor 502 and a machine-readable storage medium 506. Processor 502 is communicatively coupled to machine-readable storage medium 506 through a communication path 504. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 includes one (i.e., a single) central processing unit (CPU) or microprocessor or more than one (i.e., multiple) CPU or microprocessor, and/or other suitable hardware devices for retrieval and execution of instructions stored in machine-readable storage medium 506. Processor 502 may fetch, decode, and execute instructions 508-512 to determine power savings in processors.

Processor 502 may fetch, decode, and execute instructions 508 to exploit dynamic timing slack of a processor as previously described herein. Processor 502 may fetch, decode, and execute instructions 510 to determine application-specific peak power and energy for a processor as previously described herein. Processor 502 may fetch, decode, and execute instructions 512 to enable module-oblivious power gating for a processor as previously described herein.

As an alternative or in addition to retrieving and executing instructions, processor 502 may include one (i.e., a single) electronic circuit or more than one (i.e., multiple) electronic circuit comprising a number of electronic components for performing the functionality of one of the instructions or more than one of the instructions in machine-readable storage medium 506. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 506 is a non-transitory storage medium and may be any suitable electronic, magnetic, optical, or other physical storage device that stores executable instructions. Thus, machine-readable storage medium 506 may be, for example, random access memory (RAM), an electrically-erasable programmable read-only memory (EEPROM), a storage drive, an optical disc, and the like. Machine-readable storage medium 506 may be disposed within system 500, as illustrated in FIG. 11. In this case, the executable instructions may be installed on system 500. Alternatively, machine-readable storage medium 506 may be a portable, external, or remote storage medium that allows system 500 to download the instructions from the portable/external/remote storage medium. In this case, the executable instructions may be part of an installation package.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
generating, via a processing system, gate-level activity information of a software-programmable processor design for all possible executions of a target application for any possible inputs to the target application to identify parts of the software-programmable processor design that are not exercised by the target application; and
performing, via the processing system, a constrained timing analysis on the software-programmable processor design based on the gate-level activity information to determine a minimum operating voltage for executing the target application on the software-programmable processor design such that parts of the software-programmable processor design that are exercised by the target application are guaranteed to meet timing constraints of the software-programmable processor design while parts of the software-programmable processor design that are not exercised by the target application are allowed to violate the timing constraints.

2. The method of claim 1, wherein generating the gate-level activity information comprises performing symbolic simulation to identify unexercisable gates of the software-programmable processor design.

3. The method of claim 2, wherein performing symbolic simulation comprises:
initializing a list of unexercisable gates as all gates of the software-programmable processor design;
initializing all inputs of the processor design to Xs, where each X represents an unknown logic value;
simulating the target application on the software-programmable processor design; and
removing each gate that toggles and each gate through which an X propagates during the simulation from the list of unexercisable gates.

4. The method of claim 1, wherein performing the constrained timing analysis comprises:
   identifying exercisable paths based on the gate-level activity information; and
   performing a voltage safety analysis on each exercisable path to determine the minimum voltage at which the exercisable paths meet timing constraints.

5. The method of claim 4, wherein performing the voltage safety analysis comprises performing the voltage safety analysis for worst case timing conditions.

6. The method of claim 4, wherein performing the voltage safety analysis comprises lowering the voltage in steps and performing constrained timing analysis at each step to determine the lowest voltage at which the exercisable paths meet timing constraints.

7. The method of claim 1, further comprising:
   sizing an energy harvester for the software-programmable processor design based on the minimum operating voltage.

8. The method of claim 1, further comprising:
   sizing an energy storage device for the software-programmable processor design based on the minimum operating voltage.

9. A system comprising:
   a non-transitory machine readable storage medium storing instructions; and
   a processor to execute the instructions to:
      generate gate-level activity information of a software-programmable processor design for all possible executions of a target application for any possible inputs to the target application to identify parts of the software-programmable processor design that are not exercised by the target application; and
      perform a constrained timing analysis on the software-programmable processor design based on the gate-level activity information to determine a minimum operating voltage for executing the target application on the software-programmable processor design such that parts of the software-programmable processor design that are exercised by the target application are guaranteed to meet timing constraints of the software-programmable processor design while parts of the software-programmable processor design that are not exercised by the target application are allowed to violate the timing constraints.

10. The system of claim 9, wherein the processor is to execute the instructions to generate the gate-level activity information by performing symbolic simulation to identify unexercisable gates of the software-programmable processor design.

11. The system of claim 10, wherein the processor is to execute the instructions to perform symbolic simulation by:
   initializing a list of unexercisable gates as all gates of the software-programmable processor design;
   initializing all inputs of the software-programmable processor design to Xs, where each X represents an unknown logic value;
   simulating the target application on the software-programmable processor design; and
   removing each gate that toggles and each gate through which an X propagates during the simulation from the list of unexercisable gates.

12. The system of claim 9, wherein the processor is to execute the instructions to perform the constrained timing analysis by:
   identifying exercisable paths based on the gate-level activity information; and
   performing a voltage safety analysis on each exercisable path to determine the minimum voltage at which the exercisable paths meet timing constraints.

13. The system of claim 12, wherein the processor is to execute the instructions to perform the voltage safety analysis by performing the voltage safety analysis for worst case timing conditions.

14. The system of claim 12, wherein the processor is to execute the instructions to perform the voltage safety analysis by lowering the voltage in steps and performing constrained timing analysis at each step to determine the lowest voltage at which the exercisable paths meet timing constraints.

15. The system of claim 9, wherein the processor is to execute the instructions to further size an energy harvester for the software-programmable processor design based on the minimum operating voltage.

16. The system of claim 9, wherein the processor is to execute the instructions to further size an energy storage device for the software-programmable processor design based on the minimum operating voltage.

17. A method comprising:
   receiving, via a processing system, an application binary for a target application;
   analyzing, via the processing system, the application binary to determine parts of a software-programmable processor design that cannot be exercised by the application binary and parts of the software-programmable processor design that can be exercised by the application binary; and
   performing, via the processing system, a constrained timing analysis on the software-based processor design based on the parts of the software-programmable processor design that can be exercised by the application binary to determine the minimum operating voltage for executing the application binary on the software-programmable processor design.

18. The method of claim 17, wherein analyzing the application binary comprises evaluating a control flow graph (CFG) of the application binary symbolically on the software-programmable processor design to determine which logic of the software-programmable processor design the application binary could toggle and which logic of the software-programmable processor design the application binary could never toggle.

19. The method of claim 17, wherein performing the constrained timing analysis comprises performing the constrained timing analysis for worst case timing conditions such that the minimum operating voltage is guaranteed to be safe independent of process, voltage, and temperature variations.

20. The method of claim 17, wherein the parts of the software-programmable processor design that cannot be exercised by the application binary are allowed to violate timing constraints of the software-programmable processor design.

* * * * *